United States Patent
Pham et al.

(10) Patent No.: US 12,452,536 B2
(45) Date of Patent: Oct. 21, 2025

(54) ELECTRONIC DEVICE AND ELECTRONIC DEVICE CONTROL METHOD

(71) Applicant: Samsung Electronics Co., Ltd., Suwon-si (KR)

(72) Inventors: Trung Tuan Pham, Hanoi (VN); Ngoc Hung Ho, Hanoi (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/731,849

(22) Filed: Jun. 3, 2024

(65) Prior Publication Data

US 2024/0323534 A1    Sep. 26, 2024

Related U.S. Application Data

(63) Continuation of application No. PCT/KR2023/001019, filed on Jan. 20, 2023.

(30) Foreign Application Priority Data

Jan. 28, 2022   (KR) .................. 10-2022-0013648

(51) Int. Cl.
*H04N 23/69*     (2023.01)
*G06V 10/40*     (2022.01)
(Continued)

(52) U.S. Cl.
CPC ............. *H04N 23/69* (2023.01); *G06V 10/40* (2022.01); *H04N 23/61* (2023.01);
(Continued)

(58) Field of Classification Search
CPC ........ G06V 10/24; G06V 10/25; G06V 10/75; G06V 10/764; G06V 10/40; H04N 23/58;
(Continued)

(56) References Cited

U.S. PATENT DOCUMENTS 8,581,960 B2 * 11/2013 Kiyoshige ................ G02B 7/28
348/42
9,275,308 B2    3/2016 Szeged et al.
(Continued)

FOREIGN PATENT DOCUMENTS

EP              3316568 B1    6/2023
KR    10-2017-0000311 A     1/2017
(Continued)

OTHER PUBLICATIONS

International Search Report dated Apr. 24, 2023, issued in International Patent Application No. PCT/KR2023/001019.
(Continued)

*Primary Examiner* — Boubacar Abdou Tchoussou
(74) *Attorney, Agent, or Firm* — Jefferson IP Law, LLP

(57) ABSTRACT

An electronic device and a controlling method thereof are provided. The electronic device includes a display, a first camera, a second camera, memory storing one or more computer programs, and one or more processors communicatively coupled to the display, the first camera, the second camera, and the memory, wherein the one or more computer programs include computer-executable instructions that, when executed by the one or more processors, cause the electronic device to, obtain a first image through the first camera operating in a zoom mode, control the display to display the first image, obtain a second image through the second camera operating in a normal mode, identify a third image of the first camera in the normal mode corresponding to the first image based on a zoom-in ratio in the zoom mode, by detecting an object included in the second image, obtain location information regarding the detected object in the second image, based on a relative location between the second image and the third image, obtain location information of the object in the third image corresponding to the location information obtained from the second image, and, (Continued)

based on the location information of the object, detect the object in the first image.

20 Claims, 20 Drawing Sheets

(51) Int. Cl.
  *H04N 23/61* (2023.01)
  *H04N 23/63* (2023.01)
  *H04N 23/667* (2023.01)
  *H04N 23/90* (2023.01)
(52) U.S. Cl.
  CPC ......... *H04N 23/633* (2023.01); *H04N 23/667* (2023.01); *H04N 23/90* (2023.01)
(58) Field of Classification Search
  CPC .... H04N 23/61; H04N 23/611; H04N 23/633; H04N 23/635; H04N 23/667; H04N 23/69; H04N 23/90
  See application file for complete search history.

(56) References Cited

U.S. PATENT DOCUMENTS

| | | | |
|---|---|---|---|
| 9,904,852 B2 | 2/2018 | Divakaran et al. | |
| 10,142,549 B2* | 11/2018 | Wang | H04N 23/69 |
| 10,552,971 B2 | 2/2020 | Gu et al. | |
| 10,789,472 B1 | 9/2020 | Hedley | |
| 10,819,911 B2 | 10/2020 | Ryu et al. | |
| 11,017,263 B2 | 5/2021 | Kim et al. | |
| 11,019,330 B2 | 5/2021 | Demirdjian et al. | |
| 11,128,803 B2 | 9/2021 | Joo et al. | |
| 11,196,943 B2 | 12/2021 | Gao et al. | |
| 11,956,530 B2 | 4/2024 | Shin et al. | |
| 2016/0142627 A1 | 5/2016 | Chou et al. | |
| 2019/0034734 A1 | 1/2019 | Yen et al. | |
| 2019/0045135 A1 | 2/2019 | Ryu et al. | |
| 2020/0007777 A1* | 1/2020 | Huang | H04N 23/63 |
| 2020/0042815 A1 | 2/2020 | Zak et al. | |
| 2020/0221014 A1 | 7/2020 | Shimizu et al. | |
| 2020/0382725 A1 | 12/2020 | Gao et al. | |
| 2021/0235012 A1 | 7/2021 | Sindhagatta Krishnappa et al. | |

FOREIGN PATENT DOCUMENTS

| | | |
|---|---|---|
| KR | 10-2017-0128779 A | 11/2017 |
| KR | 10-2019-0014638 A | 2/2019 |
| KR | 10-2019-0032061 A | 3/2019 |
| KR | 10-2019-0115722 A | 10/2019 |
| KR | 10-2020-0138021 A | 12/2020 |
| KR | 10-2021-0128736 A1 | 10/2021 |

OTHER PUBLICATIONS

Extended European Search Report dated Feb. 6, 2025, issued in a European Application No. 23747270.9-1207.

* cited by examiner

FIG. 5
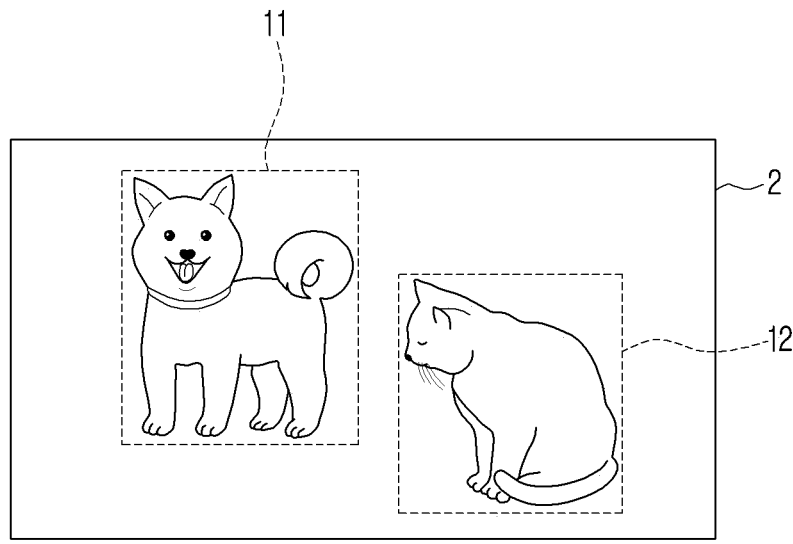
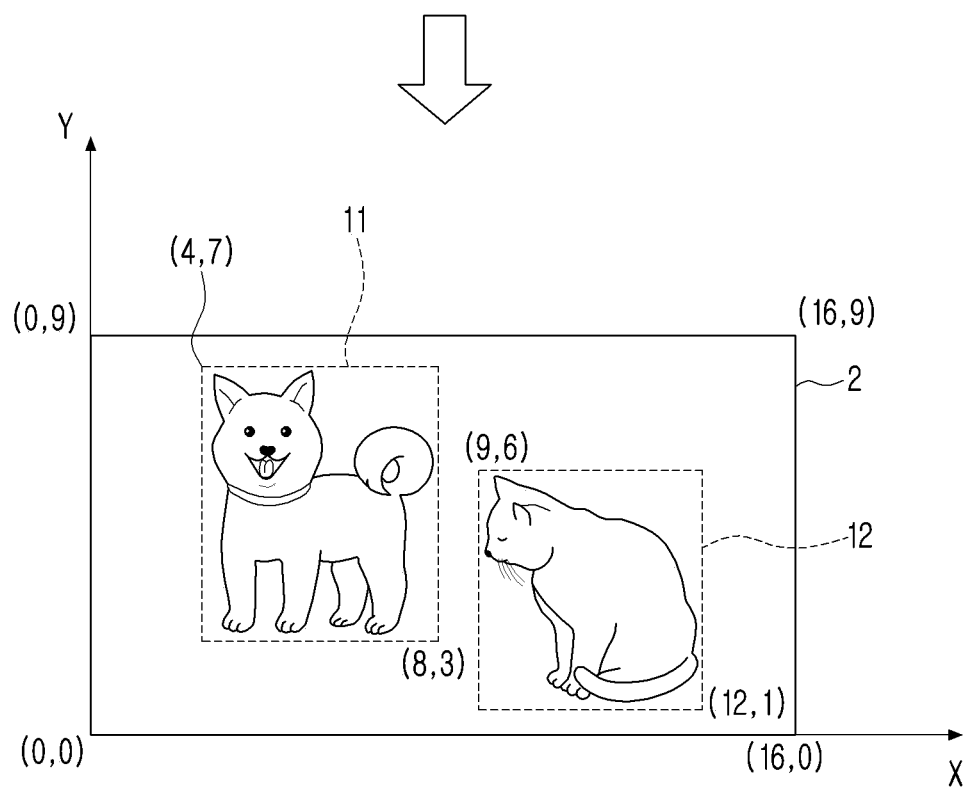

FIG. 14
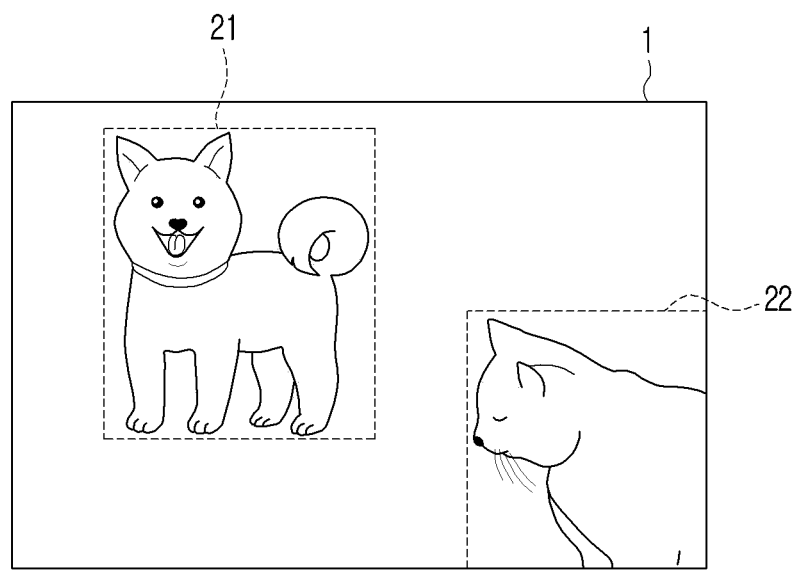
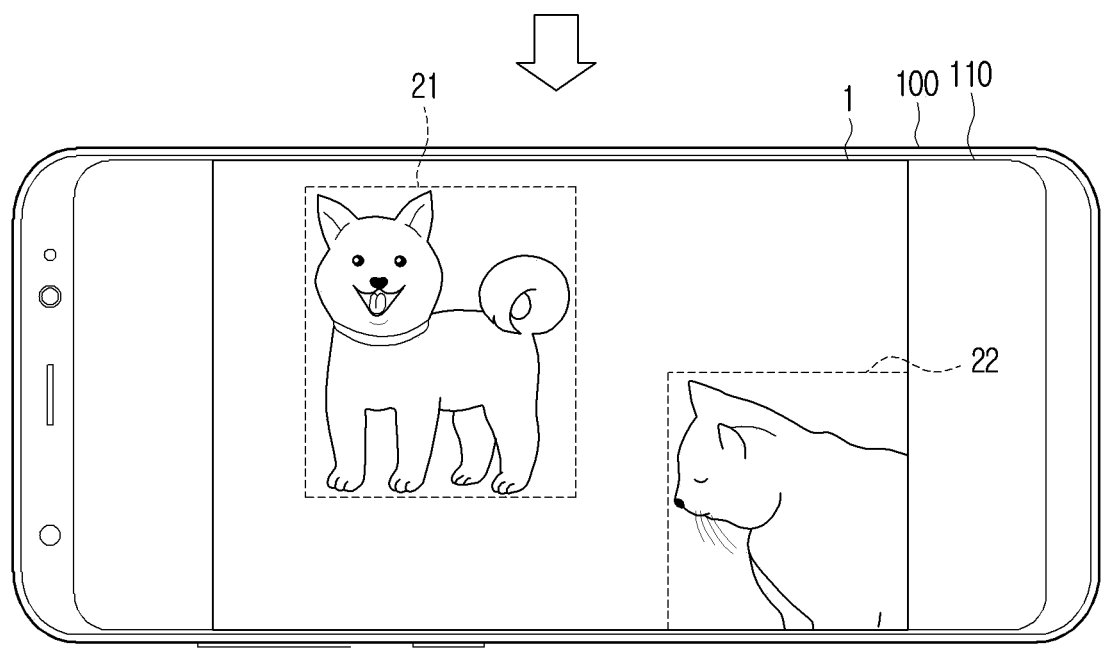

ELECTRONIC DEVICE AND ELECTRONIC DEVICE CONTROL METHOD

CROSS-REFERENCE TO RELATED APPLICATION(S)

This application is a continuation application, claiming priority under § 365(c), of an International application No. PCT/KR2023/001019, filed on Jan. 20, 2023, which is based on and claims the benefit of a Korean patent application number 10-2022-0013648, filed on Jan. 28, 2022, in the Korean Intellectual Property Office, the disclosure of which is incorporated by reference herein in its entirety.

BACKGROUND

1. Field

The disclosure relates to an electronic device and a controlling method thereof. More particularly, the disclosure relates to an electronic device that obtains location information and object recognition information regarding an object and displays the information and a controlling method thereof.

2. Description of Related Art

Along with the mobile industry, the technology of camera modules embedded in mobile devices has been constantly evolving. More particularly, although the growth rate of the smartphone market has been slowing down since 2010, when smartphones became widely available worldwide, the technology of cameras has been continuously improving. For this reason, companies that produce smartphones are also developing the technology of smartphone cameras as a final step to differentiate their smartphone specifications and producing high-specification cameras to strengthen their competitiveness in the smartphone market.

For example, whereas smartphones of the related art included only one camera each on the front and back, most of the newly-released smartphones include multiple cameras including one with a wide-angle lens, one with a standard lens, and one with a telephoto lens, depending on the angle of view.

Meanwhile, as cameras have evolved, so have the techniques for analyzing the images obtained through the cameras. For example, those techniques include detecting objects in an image, performing object recognition, and determining the type of objects. However, despite these technological advances, it is still difficult to accurately analyze an image and ultimately identify the type of object in an image when there is insufficient information regarding the object in the image (e.g., when the image does not include the full shape of the object). Therefore, there is a need for an appropriate method to resolve the above issue.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that obtains location information and object recognition information regarding an object and displays the information and a controlling method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a display, a first camera, a second camera, memory storing one or more computer programs, and one or more processors communicatively coupled to the display, the first camera, the second camera, and the memory, wherein the one or more computer programs include computer-executable instructions that, when executed by the one or more processors, cause the electronic device to obtain a first image through the first camera operating in a zoom mode, control the display to display the first image, obtain a second image through the second camera operating in a normal mode, identify a third image of the first camera in the normal mode corresponding to the first image based on a zoom-in ratio in the zoom mode, by detecting an object included in the second image, obtain location information regarding the detected object in the second image, based on a relative location between the second image and the third image, obtain location information of the object in the third image corresponding to the location information obtained from the second image, and based on the location information of the object, detect the object in the first image.

The location information includes a first coordinate value and a second coordinate value of a first bounding box including the object detected from the second image, and the first coordinate value is a coordinate value of an upper left corner of the bounding box, and the second coordinate value is a coordinate value of a lower right corner of the first bounding box.

The one or more computer programs further include computer-executable instructions that, when executed by the one or more processors, cause the electronic device to, based on a relative location between the second image and the third image, identify each of a third coordinate value and a fourth coordinate value regarding the object in the third image, based on a zoom-in ratio in the zoom mode, identify a size and location of a frame corresponding to the first image in the third image, and based on the frame including at least one of the third coordinate value or the fourth coordinate value, based on the third and fourth values, detect the object in the first image obtained through the first camera operating in the zoom mode.

The one or more computer programs further include computer-executable instructions that, when executed by the one or more processors, cause the electronic device to, based on a size and location of the frame, identify each of a fifth coordinate value and a sixth coordinate value in the first image, which correspond to the third coordinate value and the fourth coordinate value, and based on the fifth coordinate value and the sixth coordinate value, generate and display a second bounding box including the object detected from the first image, and the fifth coordinate value is a coordinate value of an upper left corner of the second bounding box, and the sixth coordinate value is a coordinate value of a lower right corner of the second bounding box.

The one or more computer programs further include computer-executable instructions that, when executed by the one or more processors, cause the electronic device to, based on the fifth coordinate value and the sixth coordinate value, identify a width of the second bounding box including the object detected from the first image, and based on the identified width of the second bounding box being equal to or greater than a predetermined value, display the second bounding box.

The one or more computer programs further include computer-executable instructions that, when executed by the one or more processors, cause the electronic device to extract a feature point regarding the object included in the second image, obtain object recognition information regarding the object based on the extracted feature point, and display the second bounding box including the object detected from the first image and object recognition information regarding the object.

The memory further stores location information regarding an object detected from the second image, and the one or more computer programs further include computer-executable instructions that, when executed by the one or more processors, cause the electronic device to, based on a new object other than the object being detected from the third image, obtain location information regarding the new object detected from the third image and update location information stored in the memory based on the location information.

The one or more computer programs further include computer-executable instructions that, when executed by the one or more processors, cause the electronic device to identify a relative location between the second image and the third image based on a separation distance of the first camera and the second camera disposed in the electronic device and a field of view angle of the first camera and a field of view angle of the second camera, and based on the identified relative location, obtain location information of the object in the third image corresponding to the location information obtained from the second image.

In accordance with another aspect of the disclosure, a method performed by an electronic device is provided. The electronic device includes a first camera and a second camera. The method includes obtaining a first image through the first camera operating in a zoom mode, displaying the first image, obtaining a second image through the second camera operating in a normal mode, identifying a third image of the first camera in the normal mode corresponding to the first image based on a zoom-in ratio in the zoom mode, by detecting an object included in the second image, obtaining location information regarding the detected object in the second image, based on a relative location between the second image and the third image, obtaining location information of the object in the third image corresponding to the location information obtained from the second image, and based on the location information of the object, detecting the object in the first image.

The location information includes a first coordinate value and a second coordinate value of a first bounding box including the object detected from the second image, and the first coordinate value is a coordinate value of an upper left corner of the bounding box, and the second coordinate value is a coordinate value of a lower right corner of the first bounding box.

The obtaining of the location information of the object in the third image includes, based on a relative location between the second image and the third image, identifying each of a third coordinate value and a fourth coordinate value regarding the object in the third image, which correspond to the first coordinate value and the second coordinate value, and based on a zoom-in ratio in the zoom mode, identifying a size and location of a frame corresponding to the first image in the third image, and based on the frame including at least one of the third coordinate value or the fourth coordinate value, based on the third and fourth values, detecting the object in the first image obtained through the first camera operating in the zoom mode.

The method includes, based on a size and location of the frame, identifying each of a fifth coordinate value and a sixth coordinate value in the first image, which correspond to the third coordinate value and the fourth coordinate value, and based on the fifth coordinate value and the sixth coordinate value, generating and displaying a second bounding box including the object detected from the first image, and the fifth coordinate value is a coordinate value of an upper left corner of the second bounding box, and the sixth coordinate value is a coordinate value of a lower right corner of the second bounding box.

The generating and displaying of the second bounding box includes, based on the fifth coordinate value and the sixth coordinate value, identifying a width of the second bounding box including the object detected from the first image, and based on the identified width of the second bounding box being equal to or greater than a predetermined value, displaying the second bounding box.

The obtaining of the location information regarding the detected object in the second image further includes extracting a feature point regarding the object included in the second image and obtain object recognition information regarding the object based on the extracted feature point, and the generating and displaying of the second bounding box includes displaying the second bounding box including the object detected from the first image and object recognition information regarding the object.

The obtaining of the location information regarding the detected object in the second image further includes storing location information regarding an object detected from the second image in memory, and includes, based on a new object other than the object being detected from the third image, obtaining location information regarding the new object detected from the third image and updating location information stored in the memory based on the location information.

The obtaining of the location information of the object in the third image includes identifying a relative location between the second image and the third image based on a separation distance of the first camera and the second camera disposed in the electronic device and a field of view angle of the first camera and a field of view angle of the second camera.

In accordance with another aspect of the disclosure, one or more non-transitory computer-readable storage media storing computer-executable instructions that, when executed by one or more processors of an electronic device, cause the electronic device to perform operations are provided. The operations include obtaining a first image through a first camera operating in a zoom mode, and displaying the first image, obtaining a second image through a second camera operating in a normal mode; identifying a third image of the first camera in the normal mode corresponding to the first image based on a zoom-in ratio in the zoom mode, by detecting an object included in the second image, obtaining location information regarding the detected object in the second image, based on a relative location between the second image and the third image, obtaining location information of the object in the third image corresponding to the location information obtained from the second image, and based on the location information of the object, detecting the object in the first image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a view illustrating obtaining location information of an object by detecting the object in the second image obtained using the second camera according to an embodiment of the disclosure;

FIG. 14 is a view of an electronic device that detects and displays an object on the first image according to an embodiment of the disclosure;

Throughout the drawings, it should be noted that like reference numbers are used to depict the same or similar elements, features, and structures.

DETAILED DESCRIPTION

Figure 1:
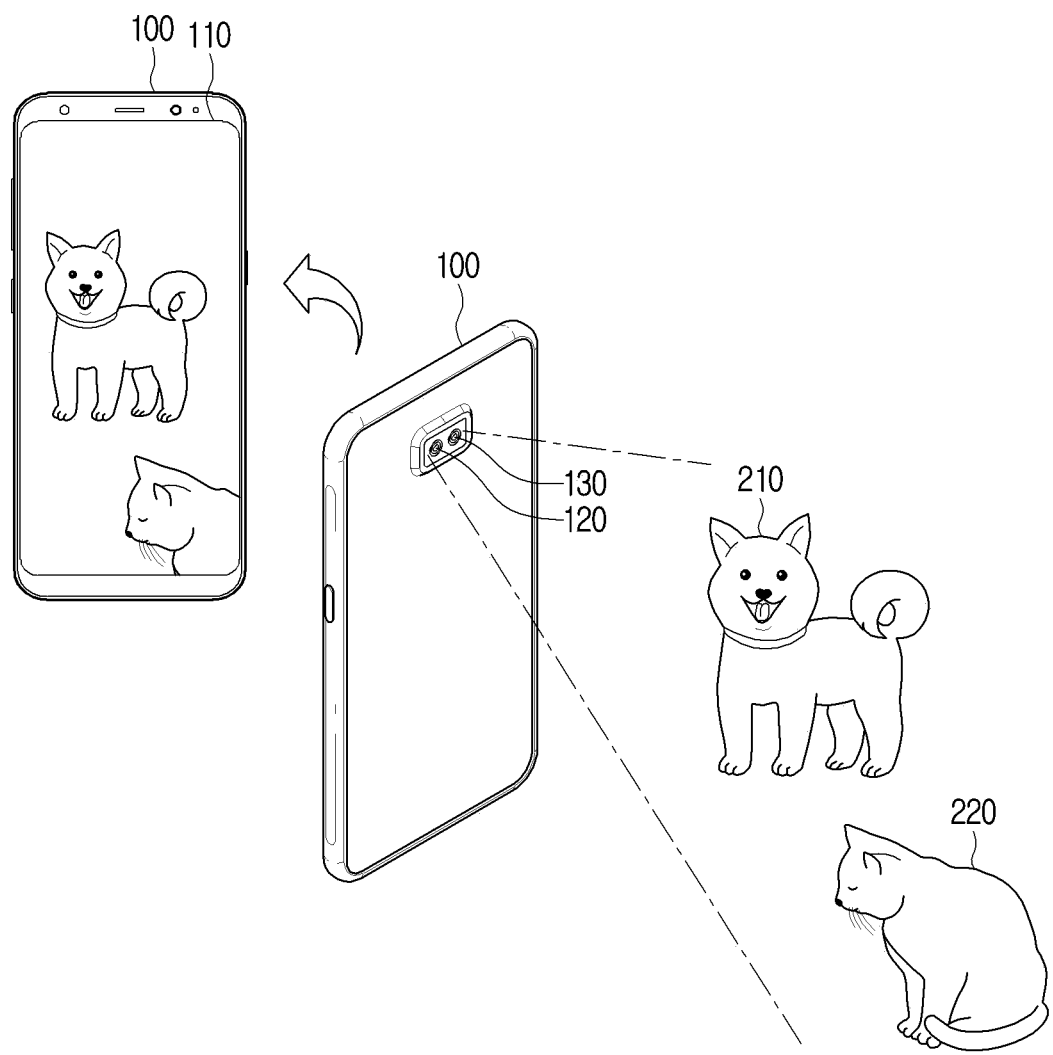
FIG. 1 is a view provided to explain configuration of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

General terms that are currently widely used are selected as the terms used in embodiments of the disclosure based on their functions in the disclosure, and may be changed based on the intention of those skilled in the art or a judicial precedent, the emergence of a new technique, or the like. In addition, in a specific case, terms arbitrarily chosen by an applicant may exist. In this case, the meanings of such terms are mentioned in corresponding descriptions of the disclosure. Therefore, the terms used in the embodiments of the disclosure need to be defined based on the meanings of the terms and the contents throughout the disclosure rather than simple names of the terms.

In the disclosure, an expression "have", "may have", "include", "may include" or the like, indicates the existence of a corresponding feature (for example, a numerical value, a function, an operation or a component, such as a part), and does not exclude the existence of an additional feature.

An expression, "at least one of A or/and B" should be understood as indicating any one of "A", "B" and "both of A and B."

Expressions "first", "second", and the like, used in the disclosure may indicate various components regardless of the sequence or importance of the components. These expressions are used only to distinguish one component from another component, and do not limit the corresponding components.

In case that any component (for example, a first component) is mentioned to be "(operatively or communicatively) coupled with/to" or "connected to" another component (for example, a second component), it is to be understood that any component is directly coupled to another component or may be coupled to another component through still another component (for example, a third component).

A term of a singular number may include its plural number unless explicitly indicated otherwise in the context. It is to be understood that a term "include", "formed of", or the like used in the application specifies the presence of features, numerals, steps, operations, components, parts, or combinations thereof, mentioned in the specification, and does not preclude the presence or addition of one or more other features, numerals, steps, operations, components, parts, or combinations thereof.

In the embodiments, a "module" or a "~er/or" may perform at least one function or operation, and be implemented by hardware or software, or be implemented by a combination of hardware and software. In addition, a plurality of "modules" or a plurality of "~ers/ors" may be integrated in at least one module and implemented by at least one processor (not illustrated) except for a "module" or an "~er/or" that needs to be implemented by specific hardware.

Hereinafter, the disclosure will be described with reference to the accompanying drawings.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 is a view provided to explain configuration of an electronic device according to an embodiment of the disclosure.

Referring to FIG. 1, an electronic device 100 according to one embodiment includes a plurality of cameras 120, 130. In this case, the electronic device 100 obtains an image of an object using a specific camera selected by a user from among the plurality of cameras 120, 130. Alternatively, the electronic device 100, in executing a program (or application) that drives the cameras, obtains an image of an object using a specific camera set in accordance with a driving order of the plurality of cameras 120, 130 set in the program (or application). Subsequently, the electronic device 100 displays the image of the object obtained by the specific camera on a display 110 of the electronic device 100.

Meanwhile, the electronic device 100, while driving the camera, adjusts the focal length of the camera based on a user input (e.g., a motion input using the user's finger, or the like) to adjust the focal length of the camera. Specifically, the electronic device 100 zooms the camera in or out by adjusting the focal length of the camera to photograph an object. The electronic device 100 may also provide a function to zoom the camera in or out by cropping the image obtained through the camera based on a user input, without actually adjusting the focal length of the camera. An example of this is a digital zoom.

At this time, if the camera photographing the object is zoomed in, the electronic device 100 may provide the user with an enlarged image of the object. Accordingly, the user may obtain more detailed information regarding the object. However, if the zooming in of the camera causes a portion of the object to be outside the angle or field of view of the camera, the user does not obtain information regarding the portion of the object. Referring to FIG. 1, the zoom-in camera allows the user to obtain complete information regarding a first object 210, which is a dog, but misses some information regarding a second object 220, which is a cat.

This is also true for the electronic device 100. For example, it is assumed that the electronic device 100 performs object recognition of an object in an image based on an image obtained regarding the object. In this case, if the image obtained by the camera includes the entire shape of the object in the image, such as a dog that is the first object 210, the electronic device 100 may perform object recognition of the first object 210 in the image accurately. Specifically, the electronic device 100 may detect the first object 210 in the image, extract a complete set of feature points for the first object 210, and based on the feature points, accurately perform object recognition for the first object 210 in the image to identify the type of the first object.

However, if an image is photographed by zooming in the camera and thus, a portion of the second object 220 is missing, such as the second object 220 in the image obtained by the electronic device for the object 200, the electronic device may not be able to accurately perform object recognition for the second object 220 in the image. Referring back to the example described above, the electronic device 100 may not be able to detect the second object 220 in the image, or may not be able to identify feature points corresponding to the missing portion of the object in the image from among the total feature points for the second object 220. Accordingly, the electronic device 100 may not be able to detect the second object 220, and thus may not be able to perform object recognition at all, or may not be able to produce accurate object recognition results even if the second object 220 is detected.

To address the above problems, the disclosure obtains an image of the object through a second camera 130 other than the first camera 120 in response to receiving a zoom-in input regarding the first camera 120 that is operating. At this time, the electronic device 100 drives the second camera 130 in a normal mode. In addition, based on the image of the object obtained through the second camera 130 in the normal mode, the electronic device 100 detects the object, performs object recognition on the object, and obtains a detection result of the object and an object recognition result.

Subsequently, the electronic device 100 detects an object within the first camera (i.e., the first camera operated in the zoom-in mode) 120 based on the obtained detection result of the object and the object recognition result, and performs object recognition on the object. Accordingly, the electronic device 100 may accurately detect the object 200 even if the image obtained through the first camera 120 does not include the entire shape of the object, and may accurately perform object recognition on the detected object 200. Hereinafter, referring to FIGS. 2 and 16, an embodiment of the disclosure in this regard will be described.

Figure 2:
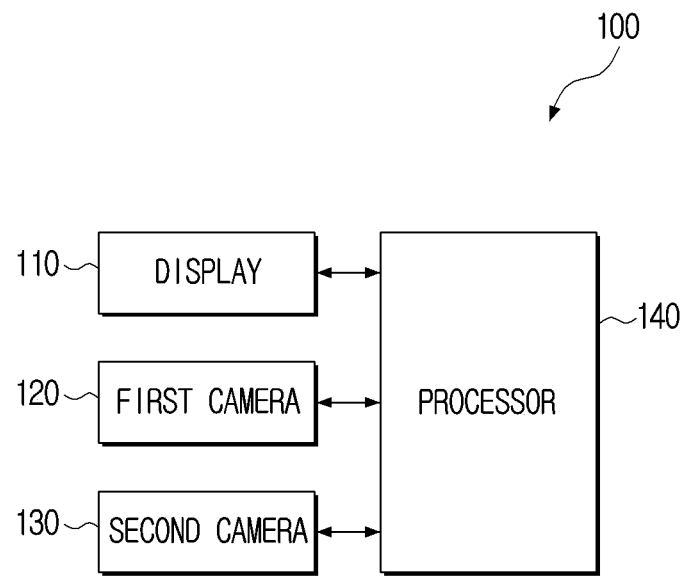
FIG. 2 is a block diagram of an electronic device according to an embodiment of the disclosure.

FIG. 2 is a block diagram of an electronic device according to an embodiment of the disclosure.

According to an embodiment, the electronic device 100 includes a variety of electronic devices including a display and a plurality of cameras, such as a cell phone, a smartphone, a tablet personal computer (PC), a laptop PC, and the like. However, the electronic device 100 is not limited thereto, and the electronic device 100 may include various electronic devices including a display, such as a computer, a smart television (TV), or the like, including a plurality of cameras, or operating in connection with a s plurality of separate camera devices.

Referring to FIG. 2, according to an embodiment, the electronic device 100 includes the display 110, the first camera 120, the second camera 130, and a processor 140.

The display 110 displays one or more images, such as images obtained via the first and second cameras 120, 130 under the control of the processor 140. To this end, the display 110 may be implemented as a liquid crystal display (LCD), plasma display panel (PDP), organic light emitting diodes (OLED), transparent OLED (TOLED), or the like. When configured as an LCD, the display 110 may also include a drive circuit and a backlight unit, which may be implemented in the form of an a-si TFT, a low temperature poly silicon (LTPS) TFT, an organic TFT (OTFT), or the like.

The display 110 may also be implemented as a flexible display or a foldable display. To this end, the display 110 may be implemented with a material having flexible properties, such as a plastic substrate (e.g., a polymer film), thin glass, or metal foil that can be deformed by external pressure.

According to an embodiment, the first camera 120 and the second camera 130 are configured to photograph an object 200 to generate a captured image and here, the captured image includes both moving images and still images.

The first camera 120 refers to a camera executed by a user from among the plurality of cameras. Specifically, the first camera 120 refers to a camera that obtains a captured image of an object in real time after being selected by the user via an interface for photographing the object from among a plurality of cameras included in an electronic device 100. Alternatively, with reference to the example described above, the first camera 120 may refer to a camera having a first priority in a predetermined priority related to a driving order of the plurality of cameras. However, the first camera 120 is not limited thereto.

Meanwhile, the second camera 130 refers to at least one camera from among the plurality of cameras other than the first camera 120. In other words, if the first camera 120 corresponds to a camera selected by the user via the interface from among the plurality of cameras, the second camera 130 corresponds to a camera that is not selected by the user.

In this case, the processor 140 may perform the operation of obtaining an image of the external object 200 via the second camera 130, unlike the first camera 120, in the background of the electronic device 100. Accordingly, the processor 140 may display the image of the external object 200 obtained by the first camera 120 on the display 110, while the image of the external object 200 obtained by the second camera 130 may not be displayed on the display 110.

Meanwhile, according to an embodiment, the first camera 120 and the second camera 130 may obtain images of the at least one external object 200, and may be implemented as cameras, lenses, infrared sensors, and the like.

The first camera 120 and the second camera 130 may be operated in a normal mode and in a zoom mode. The normal mode refers to a mode in which an image is obtained based on an initially-set focal length of the first camera 120. For example, the normal mode means a mode in which an image of an object is obtained at a default focal length predetermined for the first camera 120. Alternatively, in the case of a digital zoom method, the normal mode means a mode for displaying the original image obtained by the first camera 120 without zooming in or out on the image obtained through the first camera 120.

Meanwhile, the zoom mode refers to an operation mode of the camera, in which the focal length of the camera initially-set in the normal mode is changed and an image of an external object is obtained based on the changed focal length. In addition, the digital zoom method refers to a mode in which an image that is enlarged or reduced from the original image obtained by the first camera 120 is displayed. For example, the digital zoom mode refers to a mode in which the original image obtained by the first camera 120 is enlarged and an image cropped from the enlarged image is displayed based on the size and resolution of a display.

For convenience of explanation of the disclosure, it is described that the normal mode and the zoom mode are distinguished, but according to an embodiment, the normal mode and the zoom mode may not be clearly distinguished. When the processor 140 receives a user's zoom-in or zoom-out input, and adjusts the camera or the image obtained from the camera and displays the same in response to the user's zoom-in or zoom-out input, this may be referred to as a zoom-in mode.

Meanwhile, the first camera 120 and the second camera 130 according to an embodiment may each include an image sensor and a lens. Here, the lenses may have different field of views (FOVs). For example, the first camera 120 and the second camera 130 may include at least one of a telephoto lens, a wide-angle lens, or a super wide-angle lens. However, when the first camera 120 includes a telephoto lens, the second camera 130 may include either a wide-angle lens or a super wide-angle, unlike the first camera 120. In other words, the first camera 120 and the second camera 130 may each include a lens with a different field of view, which does not overlap.

Meanwhile, as shown in FIG. 1, it is described that the first camera 120 and the second camera 130 are disposed on the rear surface of the electronic device 100 so that the electronic device 100 includes the first camera 120 and the second camera, that is, two cameras. However, there is no particular limitation on the number and type of cameras.

The processor 140 may control the overall operations of the electronic device 100. To this end, the processor 140 may include random-access memory (RAM), read only memory (ROM), a central processing unit (CPU), a graphics processing unit (GPU), and a system bus, and may execute operations or data processing related to controlling one or more components of the electronic device 100. The processor 140 may control one or more components included in the electronic device 100 by executing one or more instructions stored in a storage, may control one or more components as a chip within a hardware circuit, or may control one or more components as a combination of software and hardware.

Figure 3:
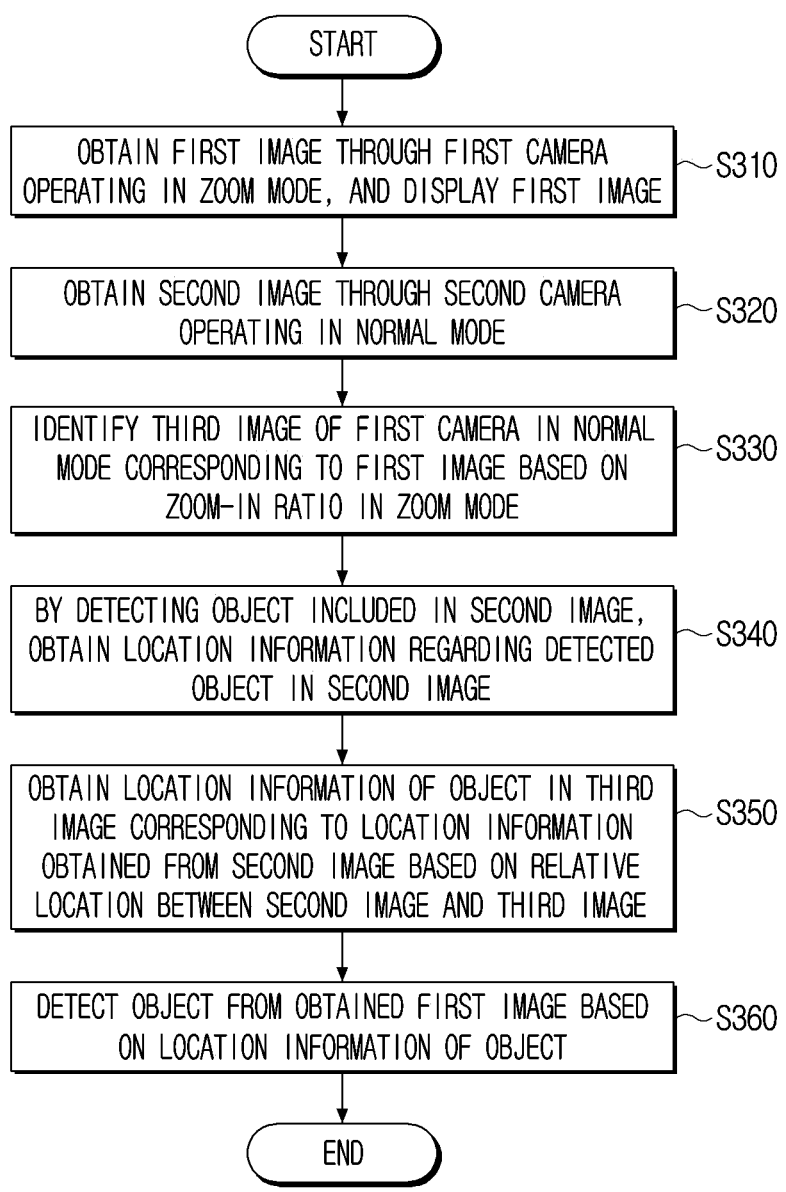
FIG. 3 is a flowchart schematically illustrating a method of detecting an object in a first image obtained in a zoom mode of a first camera based on a second image obtained using a second camera according to an embodiment of the disclosure.

FIG. 3 is a flowchart schematically illustrating a method of detecting an object in a first image obtained in a zoom mode of a first camera, based on a second image obtained using a second camera according to an embodiment of the disclosure.

Figure 4:
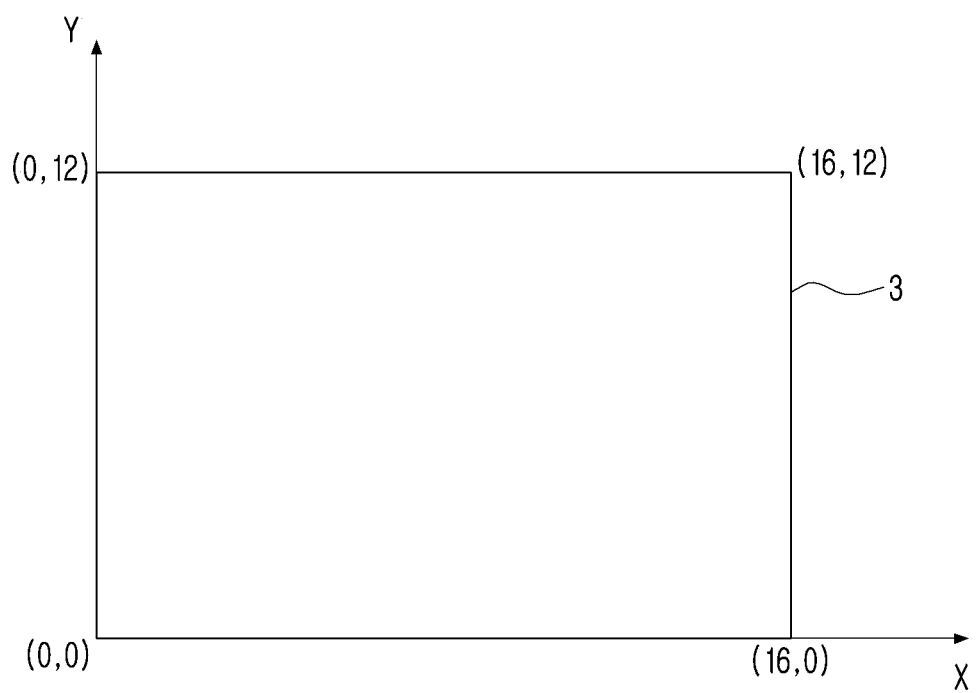
FIG. 4 is a view illustrating identifying a third image of the first camera in a normal mode corresponding to the first image based on a zoom-in ratio in a zoom mode according to an embodiment of the disclosure.

FIG. 4 is a view illustrating identifying a third image of the first camera in a normal mode corresponding to the first image based on a zoom-in ratio in a zoom mode according to an embodiment of the disclosure.

FIG. 5 is a view illustrating obtaining location information of an object by detecting the object in the second image obtained using the second camera according to an embodiment of the disclosure.

Firstly, referring to FIG. 3, the processor 140 obtains a first image 1 via the first camera 120 operating in a zoom mode, and displays the first image 1 on the display 110 operation S310.

Specifically, the processor 140 obtains the first image 1 regarding the external object 200 using the first camera 120, enlarges the obtained image based on a zoom-in ratio set in connection with the zoom mode (or input from the user in connection with driving the camera in the zoom mode), and crops the enlarged image based on the size, proportion, resolution, or the like, of the display 110. Subsequently, the processor 140 controls the display 110 to display the obtained first image.

Meanwhile, the disclosure is not limited to the above, the processor 140 may also adjust the focal length of the lens included in the first camera 120 to obtain the first image 1 of the object 200. However, for convenience of explanation of the disclosure, hereinafter, it will be described that the processor 140 utilizes the cameras 120, 130 to obtain images (e.g., first and second images) based on a digital zooming method.

Meanwhile, the processor 140 may also receive a user command to change the mode of the first camera operating in the normal mode to the zoom mode prior to operating in the zoom mode. In this case, the processor 140 receives a user command to change the mode of the first camera 120 operating in the normal mode to the zoom mode via the display 110 having a display panel or via an input interface. For example, the processor 140 may detect a touch input or a motion input using the user's finger, to change the mode of the first camera to the zoom-in mode through the display 110. More specifically, the processor 140 may detect a first touch input and a second touch input via the display 110, calculate a distance between the location of the first touch input and the location of the second touch input, and detect that a user command to change the mode of the first camera 120 to the zoom-in mode has been input if the location of at least one of the location of the first touch input or the location of the second touch input is changed such that the distance between the location of the first touch input and the location of the second touch input is increased.

Meanwhile, according to an embodiment, the user command to change to the zoom mode may also include information regarding a zoom-in ratio (or magnification) and a zoom-out ratio (or magnification). Referring back to the example described above, when the location of at least one of the first touch input and the second touch input is changed such that the distance between the first touch input and the second touch input is increased, the processor 140 may increase the zoom-in magnification of the first camera 120 in response to the increased distance. In other words, the processor 140 may simultaneously receive not only the user's input to change the mode of the first camera 120 to the zoom mode but also information regarding a zoom-in ratio or zoom-out ratio regarding the zoom mode.

Referring back to FIG. 3, after displaying the first image at operation S310, the processor 140 obtains the second image via the second camera 130 operating in the normal mode operation S320.

Specifically, the processor 140 drives the second camera 130 other than the first camera 120 that is operated to obtain the first image shown on the display, and obtains a second image of the object 200 through the second camera 130. At this time, the processor 140 may obtain the second image of the object 200 in the normal mode of the second camera 130. As previously described, the normal mode refers to a mode in which the original image obtained regarding the object is displayed without altering (e.g., zooming in or out) the image obtained through the second camera 130. Alternatively, the normal mode refers to a mode in which an image regarding the object 200 is obtained without changing the focal length of the second camera 130 or at a default focal length predetermined for the second camera 130.

Meanwhile, according to an embodiment, an Object & Imager Distance (O/I) value for the first camera 120 and the object 200 in the normal mode and the O/I value for the second camera 130 and the object 200 in the normal mode may be the same. However, the disclosure is not limited thereto.

Referring back to FIG. 3, according to an embodiment, the processor 140 identifies a third image 3 of the first camera 120 in the normal mode corresponding to the first image 1 based on a zoom-in ratio in the zoom mode at operation S330.

The third image 3 refers to an original image or an image frame of the object that can be obtained using the first camera 120. Alternatively, the third image 3 refers to an image or an image frame that can be obtained regarding the object without adjusting the focal length of the first camera 120. The third image 3 differs from the first image 1 in that it is not actually obtained by the first camera 120 capturing the object, but corresponds to an image that is identified as being obtained regarding the object in the normal mode of the first camera 120, based on the zoom-in ratio of the first camera 120 operating in the zoom mode and the second image 2. In other words, the third image 3 may not include information regarding the object. Meanwhile, in order to identify the third image 3, the processor 140 may identify the third image 3 of the first camera 120 in the normal mode that corresponds to the first image obtained regarding the object 200, based on a zoom-in ratio in the zoom mode. For example, according to an embodiment, it is assumed that the processor 140 receives a user command to change to the zoom mode and a user command for a zoom-in ratio X2. At this time, the processor 140 may display a two-fold enlarged image on the display 110 regarding the object 200 via the first camera 120 on the display 110. In addition, based on the zoom-in ratio X2, the processor 140 may identify the third image 3 from the first camera in the normal mode that corresponds to the first image 1 displayed on the display 110.

Referring to FIG. 4, according to an embodiment, the processor 140 may establish a virtual coordinate system and identify the third image 3 in the established virtual coordinate system. For example, referring to FIG. 4, the processor 140 may identify the third image 3 after positioning the lower left corner of the third image 3 at an origin on the x-y plane. In this case, the coordinate values of the corners other than the lower left corner of the third image 3 on the x-y plane (e.g., the upper left corner, the lower right corner, and the upper right corner) may be set based on the resolution of the first camera, the size and proportion of the image obtained through the first camera 120, the size of the display, and the like.

Hereinafter, for convenience of explanation of the disclosure, it is assumed that the ratio of the images obtained through the first camera 120 (e.g., the first image 1 and the third image 3 corresponding to the first image) is 16:12. In this case, referring to FIG. 4, the processor 140 identifies the coordinate value of the lower left corner of the third image 3 as (0, 0), the coordinate value of the upper left corner as (0, 12), the coordinate value of the lower right corner as (16, 0), and the coordinate value of the upper right corner as (16, 12).

Referring back to FIG. 3, according to an embodiment, the processor 140, by detecting the object 200 included in the second image 2, obtains location information regarding the object at operation S340.

Specifically, the processor 140 may identify feature points on the second image 2, cluster a set of feature points, or a plurality of feature points, to detect an object. Subsequently, the processor 140 identifies the location of the detected object in the second image. For example, the second image may be positioned on the x-y coordinate plane and the location regarding the detected object, i.e., a coordinate value, may be identified. Alternatively, the location of the object may be identified based on the location of a pixel regarding the detected object within the second image 2.

Meanwhile, to this end, the processor 140 may utilize an artificial intelligence-based object detection model stored in the memory of the electronic device 100. For example, the object detection model may include a convolutional neural network (CNN) model. The processor, by inputting the second image 2 to the CNN model, extracts features regarding the object 200 from at least one frame constituting the second image 2, to generate a feature map. Based on the generated feature map, the processor 140 detects the object 200 in the second image 2 and identifies the location of the object 200.

According to an embodiment, the location information of the object 200 may include a first coordinate value and a second coordinate value of a first bounding box 10 including the detected object in the second image 2, and the first coordinate value may be a coordinate value of an upper left corner of the first bounding box 10 and the second coordinate value may be a coordinate value of a lower right corner of the first bounding box 10. Specifically, the processor 140 may identify a bounding box in the form of a rectangle that corresponds to the location of the detected object in the second image 2 and includes the detected object. In this case, the first bounding box 10 refers to a bounding box regarding the object 200 detected in the second image 2 obtained through the second camera.

The processor 140 may detect an object included in the second image 2 and identify the first bounding box 10 that includes the detected object. For example, the processor 140 may identify an upper side of the bounding box based on a feature point having the largest y-coordinate value among a plurality of feature points (e.g., a set of feature points or a plurality of clustered feature points) regarding the object, and a left side of the bounding box based on a feature point having the smallest x-coordinate value among the feature points regarding the object, a right side of the bounding box based on the feature point having the largest x-coordinate value among the feature points regarding the object, and a lower side of the bounding box based on the feature point having the smallest y-coordinate value among the feature points regarding the object.

In addition, the processor 140 may then identify the location of the object in the second image 2 based on the bounding box. Specifically, the processor 140 may identify the location of the detected object 200 in the second image based on a first coordinate value, which is a coordinate value of the upper left corner of the first bounding box 10, and a second coordinate value, which is a coordinate value of the lower right corner of the first bounding box 10.

Referring to FIG. 5, the processor 140 detects the first object 210 and the second object 220 in the second image 2. Subsequently, the processor 140 identifies the first bounding box 10 (a first-1 bounding box 11 and a first-2 bounding box 12) corresponding to the first object 210 and second object 220 in the second image.

In this case, according to an embodiment, the size and proportion of the second image 2 obtained via the second camera 130 may be set based on the resolution of the second camera, the size of the display, or the like.

In addition, according to an embodiment, the size and proportion of an image obtained through the second camera 130 (e.g., the second image) and the size and proportion of an image obtained through the first camera 120 (e.g., the first image 1 and the third image 3 corresponding to the first image) may be different from each other. However, the disclosure is not limited thereto, and the size and proportion of the images obtained from the plurality of cameras 120, 130 included in the electronic device 100 may be set to be the same.

However, for convenience of explanation of the disclosure, it will be described that the size and proportion of the image obtained from the first camera 120 (e.g., the first image and the third image corresponding to the first image) and the size and proportion of the image obtained from the second camera 130 (e.g., the second image) are different from each other.

Referring back to the example described above, it is assumed that the first image 1 obtained through the first camera 120 and the third image 3 of the first camera 120 corresponding to the first image 1 are images having a size of 16:12 ratio, and the second image 2 obtained through the second camera is an image having a size of 16:9 ratio. In this case, referring to FIG. 5, the processor 140 identifies the location of the first object 210 in the second image as (4, 7), which is the first coordinate value of the first-1 bounding box 11 corresponding to the first object 210, and (8, 3), which is the second coordinate value of the first-1 bounding box 11. Subsequently, the processor 140 identifies the location of the second object 220 in the second image as (9, 6), which is the first coordinate value of the first-2 bounding box 12 corresponding to the second object 220, and (12, 1), and (12, 1), which is the second coordinate value of the first-2 bounding box 12.

Meanwhile, referring back to 3, according to an embodiment, the processor 140 obtains location information of the object in the third image 3 corresponding to the location information obtained from the second image, based on a relative location between the second image 2 and the third image 3 at operation S350.

The processor 140 may stack the third image 3 of the first camera 120 corresponding to the first image 1 with the second image obtained through the second camera 130, or may match the third image 3 and the second image 2 to identify the location of the object 200 in the third image 3. Specifically, the processor 140 may, based on the location information for the object obtained in the second image, synchronize the location information for the object 200 obtained in the second image 2 onto the third image 3 to identify the location of the object 200 in the third image 3. To this end, the processor 140 may precede the process of identifying a relative location difference between the second image 2 and the third image 3.

Specifically, in order to stack the second image 2 on the third image 3 or to synchronize information obtained from the second image (e.g., location information of the object 200 in the third image) onto the third image 3, the processor 140 must compensate for the difference in relative location between the second image 2 and the third image 3. This is because, due to the difference in location between the first camera 120 and the second camera 130 each disposed in the electronic device, even though the second image (the second image obtained through the second camera) and the third image (the third image identified to be obtained through the first camera) are obtained in the same normal mode, the locations of the objects in each image may be different. This may be due to the field of view angles of the first camera 120 and the second camera 130. Thus, in order to accurately synchronize the image (second image) obtained through each camera (e.g., the first camera 120 and the second camera 130) with the image (third image) that can be obtained, the processor 140 must identify the location of the second image 2 and the third image 3 and the difference in location.

Figure 6:
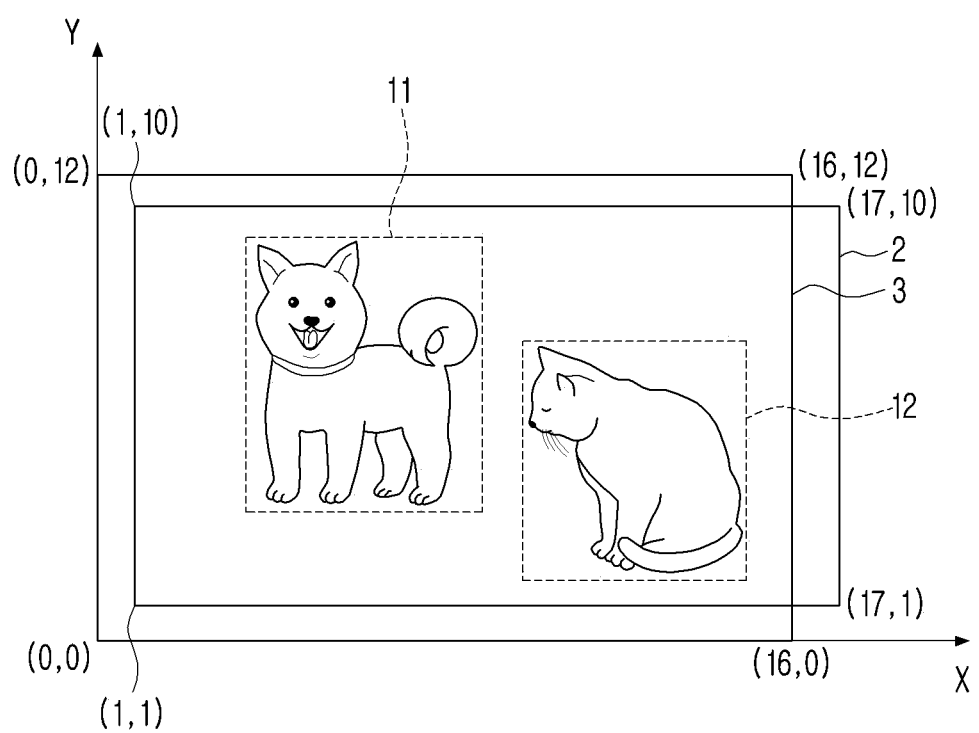
FIG. 6 is a view illustrating identifying a relative location of the second image and the third image and superimposing the second image on the third image according to an embodiment of the disclosure.

FIG. 6 is a view illustrating identifying a relative location of the second image and the third image and superimposing the second image on the third image according to an embodiment of the disclosure.

Referring to FIG. 6, the processor 140 identifies the second image 2 on the x-y plane by considering a difference in location of the second image 2 relative to the third image 3. More specifically, referring back to the example described above, the processor 140 identifies that the coordinate value of the lower left corner of the third image 3 on the x-y plane corresponds to the origin (0, 0) of the x-y coordinate system. Subsequently, the processor 140 identifies the coordinate value of the upper left corner of the third image as (0, 12), the coordinate value of the lower right corner as (16, 0), and the coordinate value of the upper right corner as (16, 12).

The processor 140 identifies the location of the second image 2 relative to the third image 3. For example, the processor 140, with reference to the third image, identifies a first displacement value (or first correction value) and a second displacement value (or second correction value) in the x-axis direction of the second image, a third displacement value (or third correction value) and a fourth displacement value (or fourth correction value) in the y-axis direction, and identifies the location of the second image 2 relative to the third image 3 on the x-y plane.

Referring back to FIG. 6, the processor 140 identifies the coordinate value of the lower left corner of the second image 2 on the x-y plane as (1, 1), the coordinate value of the upper left corner of the second image 2 as (1, 10), the coordinate value of the lower right corner as (17, 1), and the coordinate value of the upper right corner as (17, 10). Accordingly, the processor 140 may identify a relative location of the second image 2 on the x-y plane with respect to the third image 3.

Meanwhile, as described above, the processor 140 obtains location information of the object 200 in the third image 3 corresponding to the location information of the object 200 in the second image 2, which is obtained from the second image 2. Referring back to the example described above, the processor 140 may identify a first displacement value and a second displacement value in the x-axis direction of the second image 2, a third displacement value and a fourth displacement value in the y-axis direction of the second image 2 relative to the third image 3, and synchronize the identified location information of the object 200 in the second image onto the third image based on the identified first displacement value, the second displacement value, the third displacement value, and the fourth displacement value. This will be described with reference to FIGS. 8 and 9.

Meanwhile, referring back to FIG. 3, according to an embodiment, based on the zoom-in ratio in the zoom mode and the location information of the object in the third image, the object is detected in the first image obtained through the first camera operating in the zoom mode operation S360)

Specifically, in operation S350, the processor 140 identifies coordinate information of the object 200 in the third image. At this time, the processor 140 identifies the first image 1 corresponding to the third image based on the zoom-in ratio, and identifies the location of the object 200 in the first image based on the identified coordinate information of the object 200 in the third image 3. Subsequently, the processor 140 may detect the object 200 at the identified location.

Meanwhile, since the first image obtained through the first camera and the third image of the first camera corresponding to the first image are images with respect to the same first camera, the processor 140 may not perform the process of adjusting a relative location between the first and third images.

Hereinafter, with reference to FIGS. 7 and 8, an of the disclosure in which a location of an object in a third image based on a relative location of the second image 2 and the third image 3 will be described below.

Figure 7:
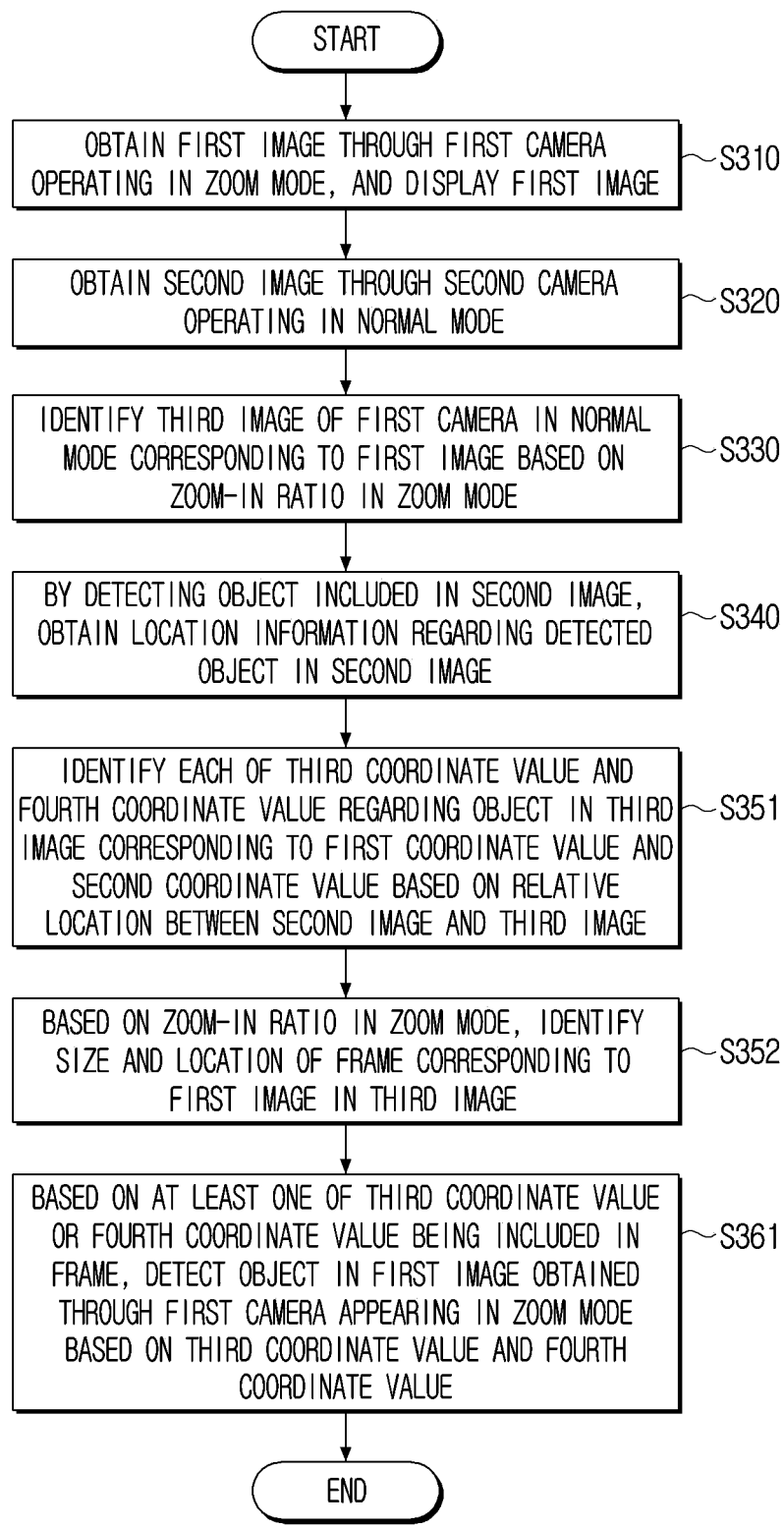
FIG. 7 is a flowchart schematically illustrating a method of identifying a location of an object in the third image based on a relative location of the second image and the third image according to an embodiment of the disclosure.

FIG. 7 is a flowchart schematically illustrating a method of identifying a location of an object in the third image based on a relative location of the second image and the third image according to an embodiment of the disclosure.

Figure 8:
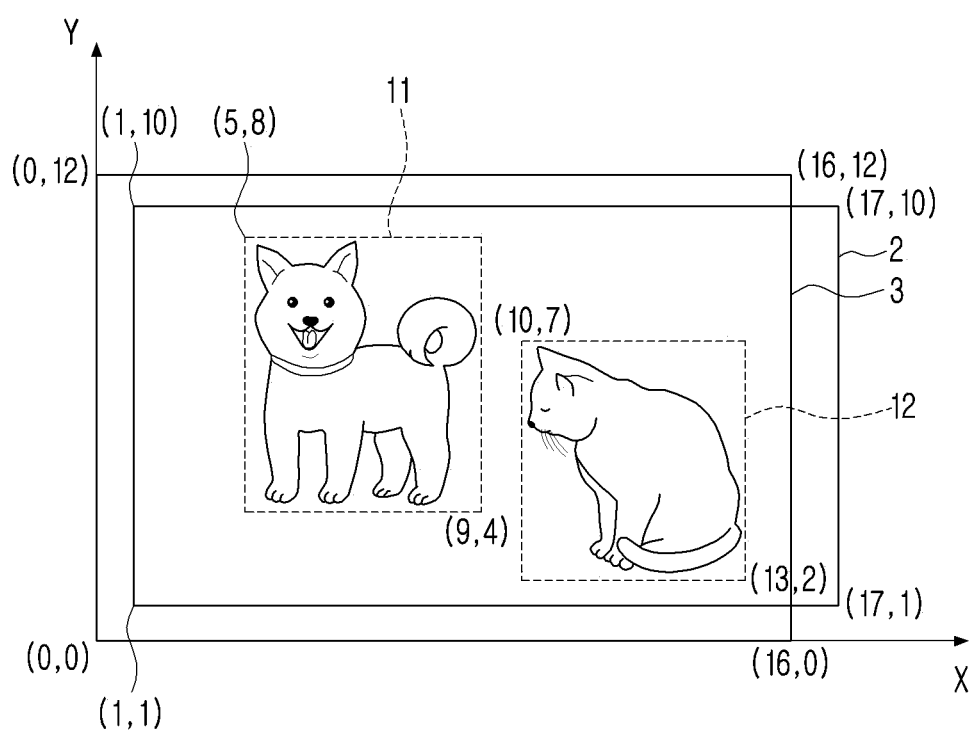
FIG. 8 is a view illustrating identifying a location of an object in the third image based on a relative location of the second image and the third image according to an embodiment of the disclosure.

FIG. 8 is a view illustrating identifying a location of an object in the third image based on a relative location of the second image and the third image according to an embodiment of the disclosure.

Figure 9:
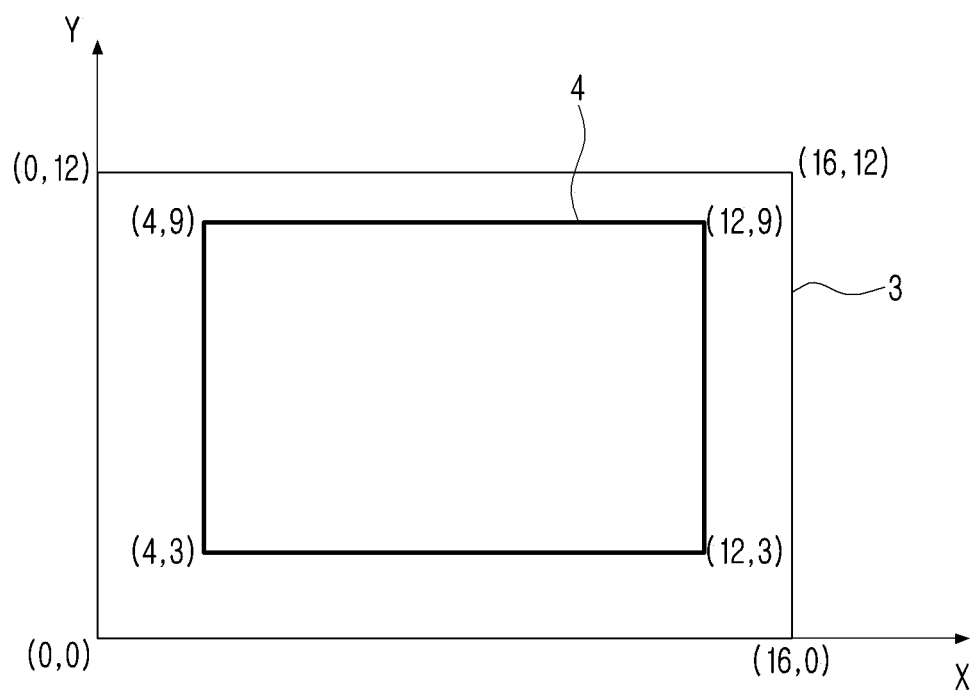
FIG. 9 is a view illustrating identifying a size and location of a frame corresponding to the first image in the third image according to an embodiment of the disclosure.

FIG. 9 is a view illustrating identifying a size and location of a frame corresponding to the first image in the third image according to an embodiment of the disclosure.

Referring to FIG. 7, according to an embodiment, the processor 140 identifies a third coordinate value and a fourth coordinate value for the object in the third image 3, corresponding to the first coordinate value and the second coordinate value, respectively, based on a relative location difference between the second image 2 and the third image 3 at operation S351.

Specifically, in order to stack the second image 2 obtained through the second camera 130 onto the third image 3 of the first camera 120, the processor 140 identified a relative location difference between the second image and the third image. Subsequently, based on the identified location difference, the processor 140 identified the location of the second image on the x-y plane of the second image with reference to the third image on the x-y plane. At this time, the processor 140 may synchronize the location information of the object 200 in the second image 2 onto the third image 3 by converting the first coordinate value and the second coordinate value, which are the location information of the object 200 obtained from the second image, into the third coordinate value and the fourth coordinate value, respectively (converting the first coordinate value into the third coordinate value and the second coordinate value into the fourth coordinate value). In other words, the processor 140 adjusts the location of the bounding box regarding the object based on the relative location between the second image 2 and the third image 3, thereby identifying the third coordinate value as the coordinate value of the upper left corner of the bounding box and the fourth coordinate value as the coordinate value of the lower right corner of the bounding box.

Referring to FIG. 8, the processor 140 converts and identifies, based on the relative location between the second image and the third image, the coordinate value of the upper left corner of the first-1 bounding box 11 (i.e., the first coordinate value) as (5, 8) and the coordinate value of the lower right corner of the first-2 bounding box 12 (i.e., the second coordinate value) as (9, 4). In other words, the processor 140 identifies the location of the first object 210 in the third image as the third coordinate value, (5, 8), and the fourth coordinate value, (9, 4). Subsequently, the processor 140 identifies the location of the second object 220 in the second image 2 based on the third coordinate value and the fourth coordinate value. Specifically, the processor 140 identifies the third coordinate value of the first-2 bounding box 12 corresponding to the second object 220 as (10, 7), and identifies the fourth coordinate value of the first-2 bounding box 12 as (13, 2).

Accordingly, the processor 140 may estimate the location of the object 200 in the third image 3 of the first camera 120 based on the second image 2 obtained through the second camera 130. In other words, as described above, the third image 3 is an image of the first camera 120 corresponding to the first image 1 that can be obtained from the first camera 120. Thus, the third image 3 does not include information regarding the object, unlike the first image 1 and the second image 2. However, the processor 140 may identify information regarding the object in the third image 3, such as the location of the object, based on the second image 2 and information regarding the object obtained based on the second image 2.

In addition, referring back to FIG. 7, according to an embodiment, the processor 140 identifies the size and location of the frame corresponding to the first image 1 within the third image 3 based on the zoom-in ratio in the zoom mode at operation S352.

Specifically, referring to FIG. 9, when assuming that the zoom-in ratio is 2×, the first image obtained in the zoom mode is a two-times magnified image of the object compared to the image obtained in the normal mode. At this time, the processor 140 identifies the size and location of the frame corresponding to the first image 1 within the third image 3 based on the zoom-in ratio of 2×. Based on the third image identified as being obtained in the normal mode, the size of the frame corresponding to the first image is 0.5 times the size of the third image. Subsequently, the processor 140 identifies the location of a frame 4 corresponding to the first image 1 on the x-y plane with reference to the third image 3. At this time, the processor 140 may identify the location of the frame 4 corresponding to the first image 1 on the x-y plane as a coordinate value of a corner of the frame 4 corresponding to the first image.

Referring to FIG. 9, the processor 140 identifies the location of the frame 4 corresponding to the first image 1 within the third image 3 by identifying the coordinate value of the upper left corner of the frame 4 corresponding to the first image as (4, 9), the coordinate value of the lower left corner as (4, 3), the coordinate value of the upper right corner as (12, 9), and the coordinate value of the lower right corner as (12, 3).

Meanwhile, referring back to FIG. 7, according to an embodiment, when at least one of the third coordinate value or the fourth coordinate value is included in the frame 4 corresponding to the first image, the processor 140 detects an object in the first image 1 obtained via the first camera 1 operating in the zoom mode based on at least one of the third coordinate value of the fourth coordinate value at operation S361.

Figure 10:
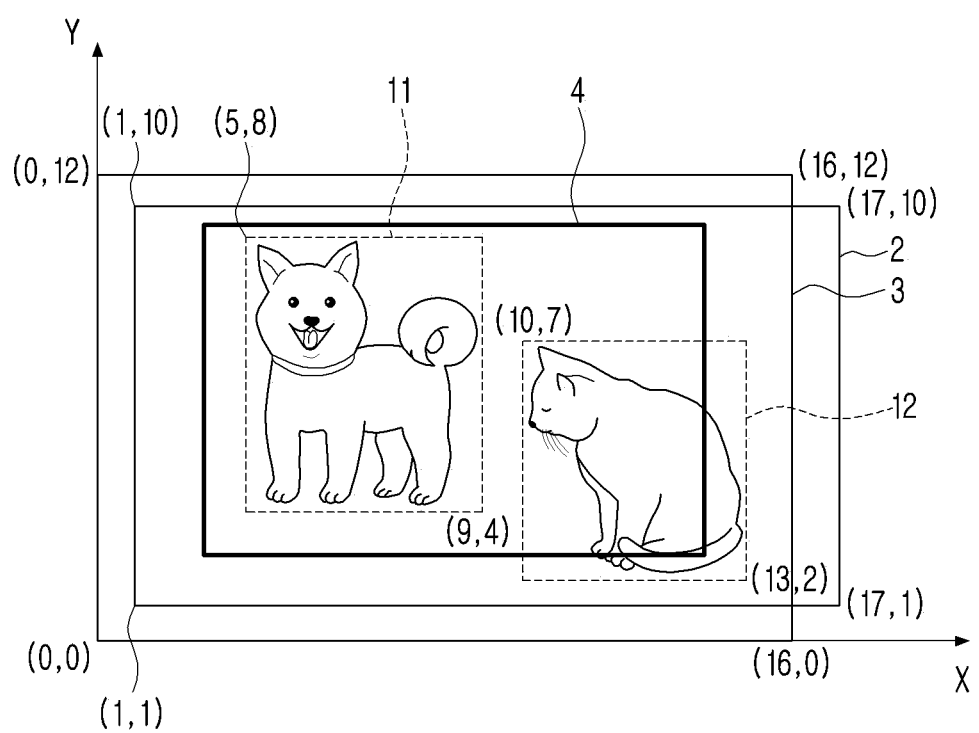
FIG. 10 is a view illustrating identifying an object based on third and fourth coordinate values included in a frame corresponding to the first image according to an embodiment of the disclosure.

FIG. 10 is a view illustrating identifying an object based on third and fourth coordinate values included in a frame corresponding to the first image according to an embodiment of the disclosure.

Specifically, depending on the zoom-in ratio or the enlarged field of view angle of the first camera 120, the first image 1 obtained by the processor 140 through the first camera 120 may not include the object 200. In this case, the processor 140 may identify that the first image does not include the object 200 based on the third and fourth coordinate values, prior to detecting the object 200 within the first image or prior to image processing of the first image to detect the object 200.

Specifically, referring to FIG. 10, the processor 140 may identify that the third coordinate value and the fourth coordinate value of the first-1 bounding box 11 are included in the frame 4 corresponding to the first image. Through this, the processor 140 identifies that the first image includes a first object corresponding to the first-1 bounding box 11. Meanwhile, the processor 140 may identify that the third coordinate value between the third coordinate value and the fourth coordinate value of the first-2 bounding box 12 is included in the frame corresponding to the first image. Through his, the processor 140 identifies that the first image includes a second object corresponding to the first-2 bounding box 12. However, in this case, the processor 140 may identify that some shape of the second object is not included in the first image 1 based on the fourth coordinate value that is not included in the frame 4 corresponding to the first image 1.

Figure 11:
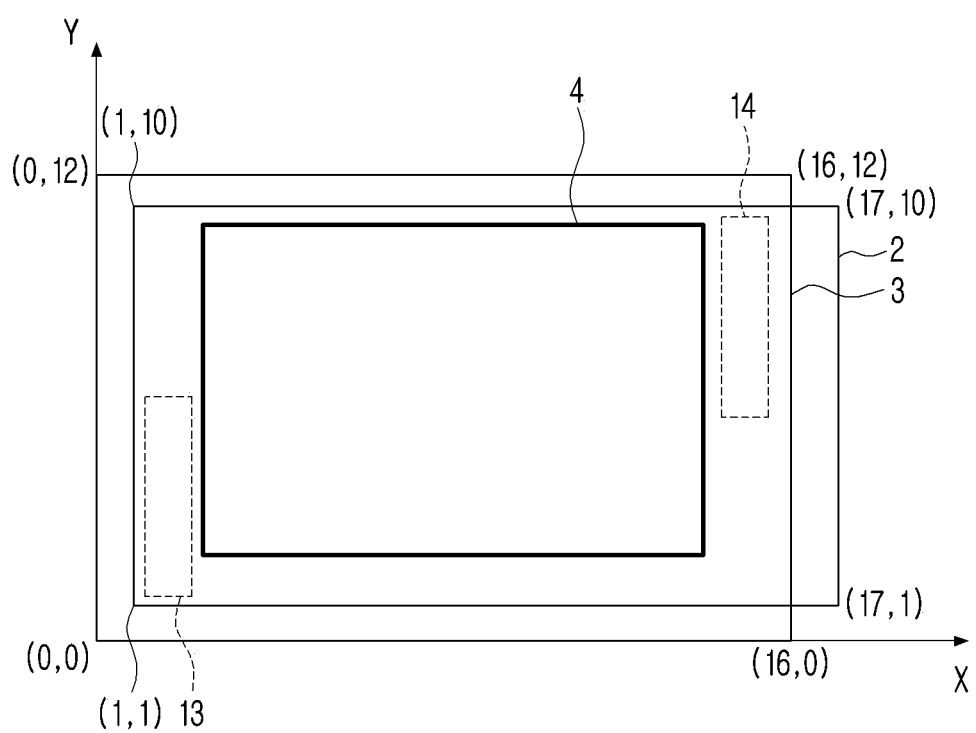
FIG. 11 is a view illustrating not detecting an object in the first image based on location information of an object in the third image according to an embodiment of the disclosure.

FIG. 11 is a view illustrating not detecting an object in the first image based on location information of the object in the third image according to an embodiment of the disclosure.

Referring to FIG. 11, the processor 140 identifies that the third coordinate value and the fourth coordinate value of a first-3 bounding box 13 and the coordinate value of a first-4 bounding box 14 and the fourth coordinate value are not included in the frame 4 corresponding to the first image. At this time, the processor 140 identifies that the object 200 included in the first image 1 obtained in the zoom mode does not exist, and may not perform the object detection or object recognition process in the first image 1.

Figure 12:
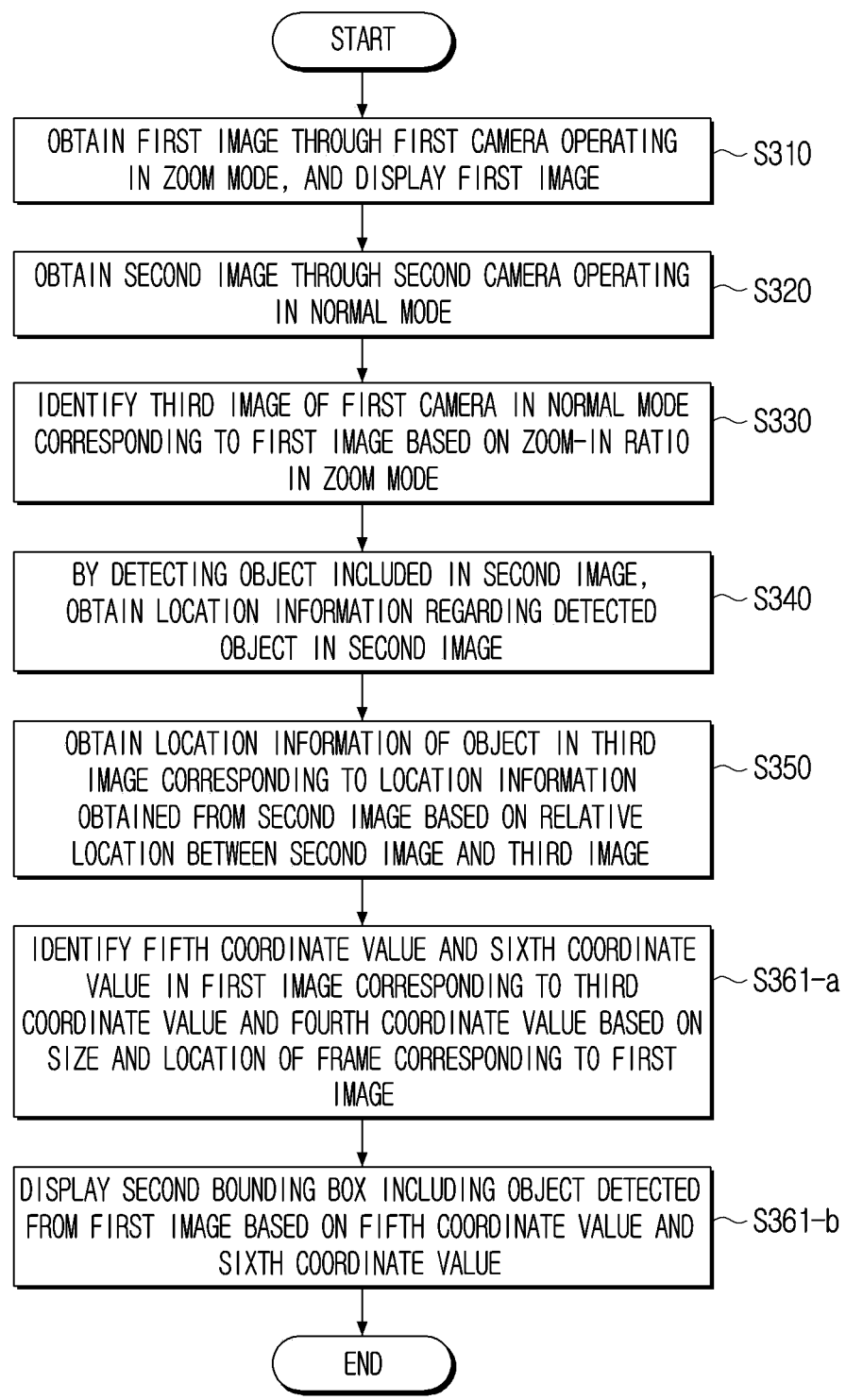
FIG. 12 is a flowchart schematically illustrating a method of detecting and displaying an object in the first image based on location information of an object in the third image according to an embodiment of the disclosure.

FIG. 12 is a flowchart schematically illustrating a method of detecting and displaying an object in the first image based on location information of the object in the third image according to an embodiment of the disclosure.

Figure 13:
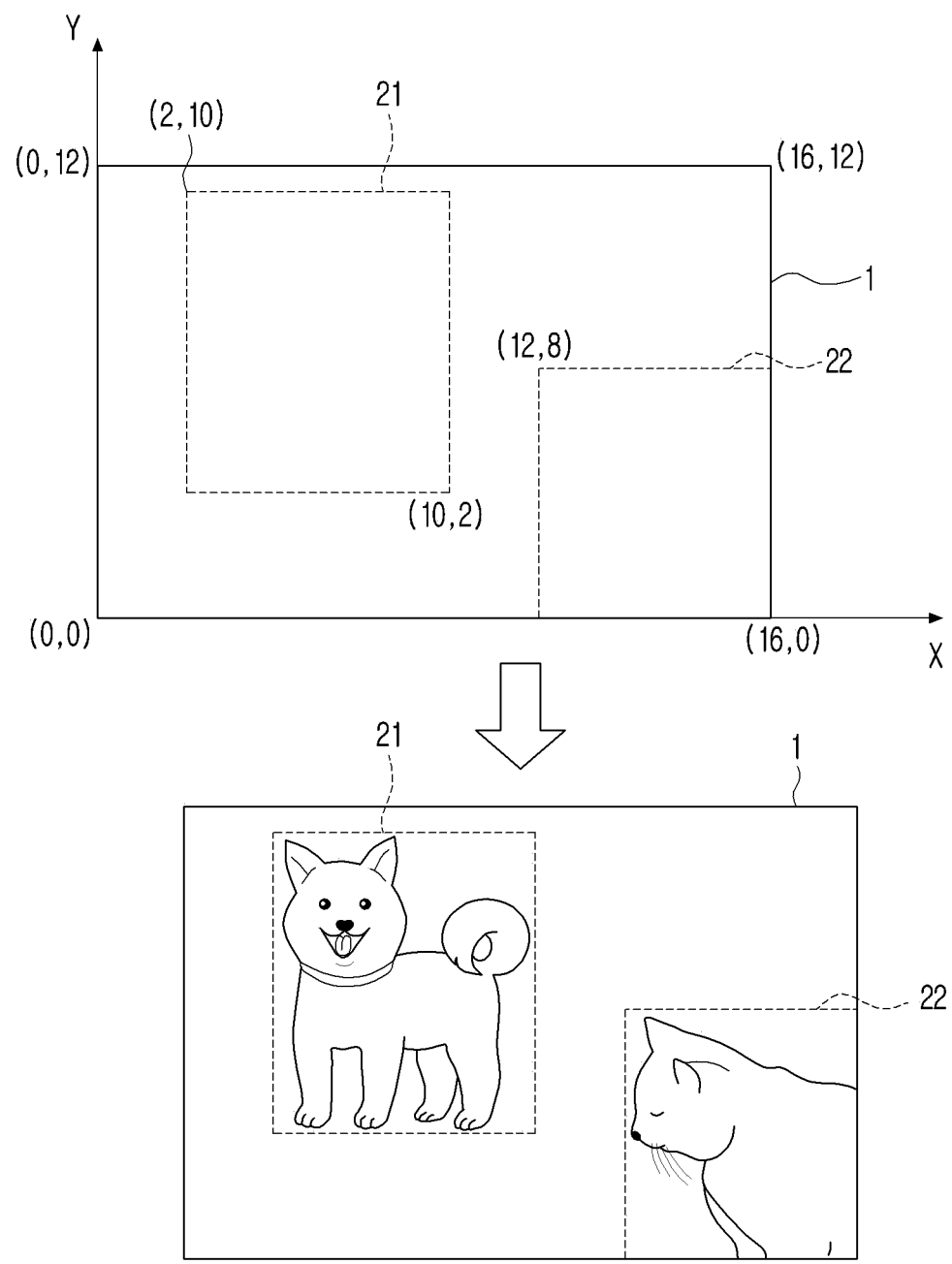
FIG. 13 is a view illustrating detecting and displaying an object in the first image based on location information of the object in the third image according to an embodiment of the disclosure.

FIG. 13 is a view illustrating detecting and displaying an object in the first image based on location information of the object in the third image according to an embodiment of the disclosure.

Referring to FIG. 12, according to an embodiment, the processor 140 identifies a fifth coordinate value and a sixth coordinate value in the first image, corresponding to the third coordinate value and the fourth coordinate value, respectively, based on the size and location of the frame 4 corresponding to the first image at operation S361-a.

At this time, according to an embodiment, the fifth coordinate value is a coordinate value of an upper left corner of the second bounding box 20 including the object detected in the first image, and the sixth coordinate value is a coordinate value of a lower right corner of the second bounding box 20.

Meanwhile, the second bounding box 20 refers to a bounding box regarding the object 200 detected in the first image. In this case, the second bounding box 20 may be generated by converting the first bounding box 10 based on the zoom-in ratio.

The processor 140 marks the second bounding box 20 including the object included in the first image 1 corresponding to the location of the object in the first image 1. To this end, the processor 140 converts the third coordinate value and the fourth coordinate value into the fifth coordinate value and the sixth coordinate value, respectively, based on the zoom-in ratio and the location and size of the frame corresponding to the first image.

Specifically, the processor 140 identifies the first image 1 on the x-y plane based on a frame corresponding to the first image, identifies the third coordinate value as the fifth coordinate value in the first image, and identifies the fourth coordinate value as the sixth coordinate value in the first image.

For example, referring to FIG. 13, the processor 140 converts (5, 8), which is the third coordinate value of the first-1 bounding box 11, into (2, 10) ((specifically, (5-4)*2, (8-3)*2)), which is the fifth coordinate value, based on the zoom-in ratio ×2 and the location and size of the frame. Subsequently, the processor 140 identifies (9, 4), which is the fourth coordinate value of the first-1 bounding box as (10, 2) (specifically, ((9-4)*2, (4-3)*2)), which is the sixth coordinate value, based on the zoom-in ratio (×2) and the location and size of the frame. More specifically, the processor 140 moves the frame corresponding to the identified first image within the third image 3, on the x-y plane such that the lower left corner of the frame is located at the origin of the x-y coordinate system, and converts the locations of the upper left corner, the upper right corner, and the lower right corner of the frame, respectively, based on the zoom-in ratio. In other words, the processor 140 identifies the location of the first image 1 on the x-y plane. Subsequently, corresponding to the size and location of the converted frame, the processor 140 converts the third coordinate value and the fourth coordinate value into the fifth coordinate value and the sixth coordinate value, respectively.

Meanwhile, referring to FIG. 13, the processor 140 identifies (10, 7), which is the third coordinate value of the first-2 bounding box 12, as (12, 8) (specifically, ((10-4)*2, (7-3)*2), which is the fourth coordinate value, in the same conversion manner as the third coordinate value and the fourth coordinate value of the first-1 bounding box 11 and the fourth coordinate value. On the other hand, the processor 140 identifies (13, 2), which is the fourth coordinate value of the first-2 bounding box 12, as (16, 0) instead of (18, −2). This is because the fourth coordinate value of the first-2 bounding box 12 is not included in the frame corresponding to the first image. Accordingly, the processor 140 converts the fourth coordinate value that is not included in the frame corresponding to the first image into the coordinate value of the lower right corner of the first image or the converted frame. In other words, the processor 140 converts the fourth coordinate value of the first-2 bounding box 12 into the sixth coordinate value of (16, 0).

In this regard, according to an embodiment, the processor 140 identifies an x-coordinate value and a y-coordinate value constituting the fifth coordinate value corresponding to the third coordinate value, and if the x-coordinate value of the fifth coordinate value is less than the x-coordinate value of the lower left corner of the first image (or the frame corresponding to the converted first image), the processor 140 identifies the x-coordinate value of the lower left corner as the x-coordinate value of the fifth coordinate value. If the y-coordinate value of the fifth coordinate value is greater than the y-coordinate value of the upper left corner of the first image (or the frame corresponding to the converted first image), the processor 140 identifies the y-coordinate value of the upper left corner as the y-coordinate value of the fifth coordinate value. Similarly, the processor 140 identifies an x-coordinate value and a y-coordinate value constituting the sixth coordinate value corresponding to the fourth coordinate value, and if the x-coordinate value of the sixth coordinate value is greater than the x-coordinate value of the lower right corner of the first image (or the frame corresponding to the converted first image), the processor 140 identifies the x-coordinate value of the lower right corner as the x-coordinate value of the sixth coordinate value. If the y-coordinate value of the sixth coordinate value is less than the y-coordinate value of the upper right corner of the first image (or the frame corresponding to the converted first image), the processor 140 identifies the y-coordinate value of the upper right corner as the y-coordinate value of the sixth coordinate value.

Referring back to FIG. 12, according to an embodiment, the processor 140 generates and displays the second bounding box 20 including the object detected in the first image based on the fifth coordinate value and the sixth coordinate value at operation S361-b.

Referring to FIG. 13, the processor 140 identifies a second-1 bounding box 21 regarding the first object in the first image 1 based on the fifth coordinate value and the sixth coordinate value that are conversion of the third coordinate value and the fourth coordinate value of the first-1 bounding box. Subsequently, the processor 140 identifies a second-2 bounding box 22 regarding the second object in the first image 1 based on the fifth coordinate value that is conversion of the third coordinate value of the first-2 bounding box and the sixth coordinate value that is conversion of the fourth coordinate value of the first-2 bounding box. Thereby, the processor 140 may estimate and detect the object in the first image 1 without the process of detecting the object in the first image 1 obtained in the zoom mode, and identify the location of the object.

FIG. 14 is a view of an electronic device that detects and displays an object on the first image according to an embodiment of the disclosure.

Referring to FIG. 14, the processor 140 detects an object in the first image based on the location information of the object obtained from the second image 2, and displays the recognition information for each object on the display 110. Thereby, the user may be provided with accurate object location information within the first image 1 obtained through the first camera 120.

Figure 15:
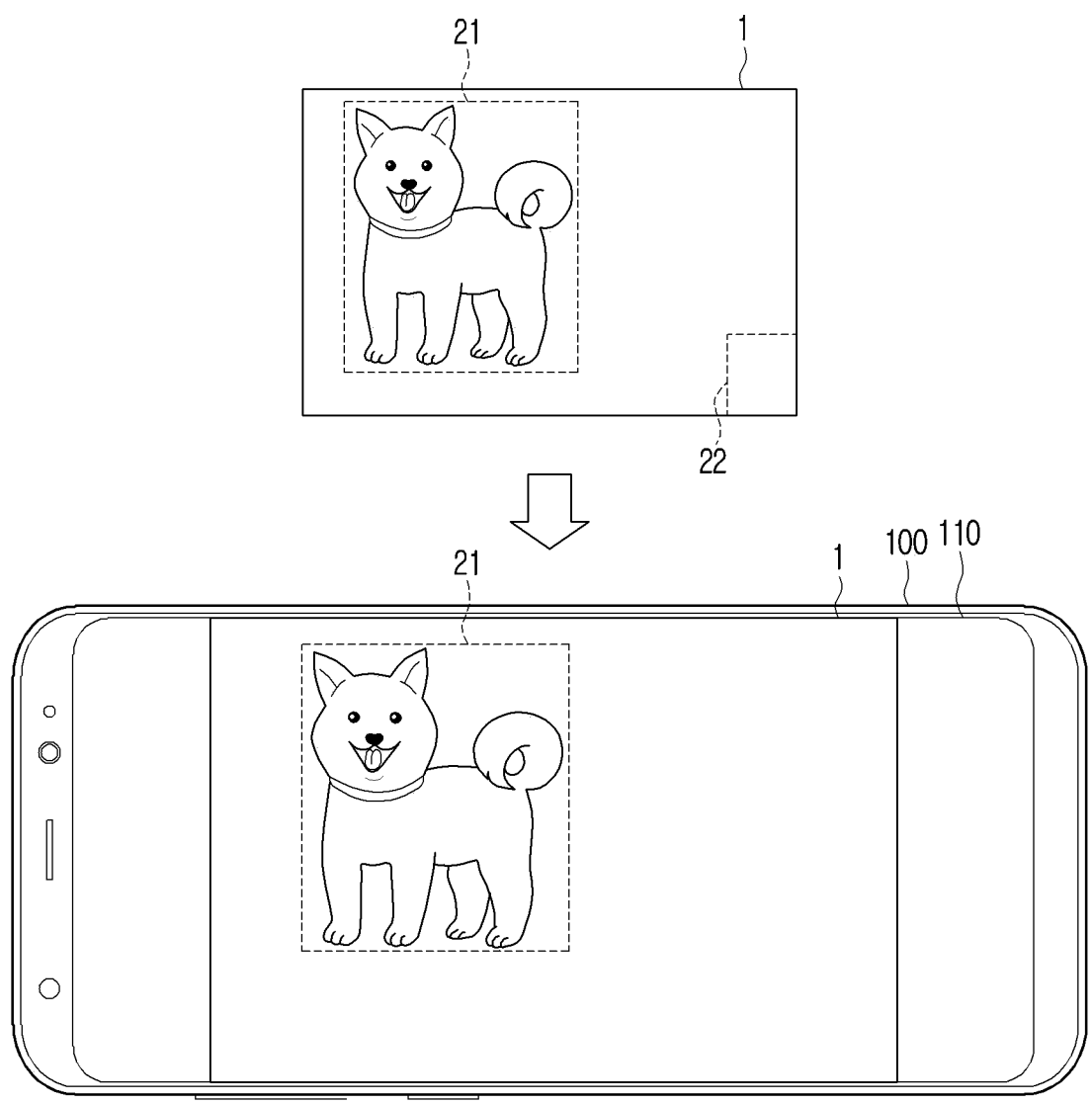
FIG. 15 is a view illustrating not detecting an object in the first image based on a second bounding box identified based on fifth and sixth coordinate values according to an embodiment of the disclosure.

FIG. 15 is a view illustrating not detecting an object in the first image based on a second bounding box identified based on fifth and sixth coordinate values according to an embodiment of the disclosure.

Meanwhile, according to an embodiment, the processor 140 may identify a width of the second bounding box 20 that includes the object detected in the first image based on the fifth coordinate value and the sixth coordinate value, and may display the second bounding box 20 if the identified width of the second bounding box 20 is greater than or equal to a predetermined value (hereinafter, the predetermined first value).

As described above, the processor 140 estimates the location of the object included in the first image 1 based on the fifth coordinate value and the sixth coordinate value, and displays the second bounding box 20 corresponding to the estimated location of the object. In this case, the fifth coordinate value and the sixth coordinate value are coordinate values with respect to the bounding box including the object, not the object itself detected in the second image. Therefore, the second bounding box 20 generated based on the fifth coordinate value and the sixth coordinate value, where the third coordinate value and the fourth coordinate value are converted, respectively, may not always include the object. Specifically, referring to FIG. 15, the second bounding box 20 generated based on the fifth coordinate value and the sixth coordinate value does not include an object or a portion of an object. Therefore, in such a case, the processor 140 calculates a width of the second bounding box 20 based on the fifth coordinate value and the sixth coordinate value. In FIG. 15, the width of the second bounding box 20 generated based on the fifth coordinate value and the sixth coordinate value is identified as 4. In this case, if it is assumed that the predetermined first value is 5, the processor 140 does not display the second bounding box 20 corresponding to the object in the first image. In other words, the processor 140 assumes that the object does not exist in the first image.

Meanwhile, according to an embodiment, the processor 140 may also detect the object in the first image using an image of the object in the second image. In other words, if the first image includes only a portion of the object, the processor 140 would have difficulty accurately detecting the object in the first image. Therefore, the processor 140 may detect the object in the first image using the second image and an image of the object included in the second image. Hereinafter, an embodiment of the disclosure in this regard will be described.

Firstly, the processor 140 identifies the width of the second bounding box 20 including the object detected in the first image based on the fifth coordinate value and the sixth coordinate value. Subsequently, the processor 140 identifies whether the width of the second bounding box 20 is less than a predetermined value (hereinafter, the predetermined second value). As described above, the processor 140 estimates the location of the object included in the first image 1 based on the fifth coordinate value and the sixth coordinate value, and displays the second bounding box 20 corresponding to the estimated location of the object. At this time, the processor 140 calculates a width of the second bounding box 20, and if the calculated width of the second bounding box 20 is identified as being less than a predetermined second value, the processor 140 identifies that the first image does not fully include information regarding the object. In other words, the processor 140 identifies that the first image includes only a portion of the object. This leads to the problem that the processor 140 is unable to accurately detect the object in the first image, and the user is unable to accurately identify the object in the first image.

To address the above-described issue, the processor 140 identifies an object image in the second image based on the first bounding box 10, and detects the object in the first image by matching the identified object image to the first image. Specifically, the processor 140 obtains an image of the object in the second image based on the second bounding box 20 of the second image. For example, the processor 140 may obtain an image of the object by cropping the image of the object within the second image based on the second bounding box 20.

Subsequently, the processor 140 matches the obtained object image to the second bounding box 20 of the first image and then detects the object in the first image. For example, the processor 140 may adjust the size of the obtained object image and display the adjusted object image in the second bounding box 20. In order to adjust the size of the object image, the processor 140 may utilize information, such as the resolution of the first camera and the second camera, the size of the first image and the second image, and the like. Alternatively, the processor 140 may display the obtained object image along with the first image. For example, the processor 140 may display the obtained object image corresponding to the second bounding box 20 overlapping the first image displayed on the display 110.

Meanwhile, the predetermined second value may be set to the same value as the first value described above.

Figure 16:
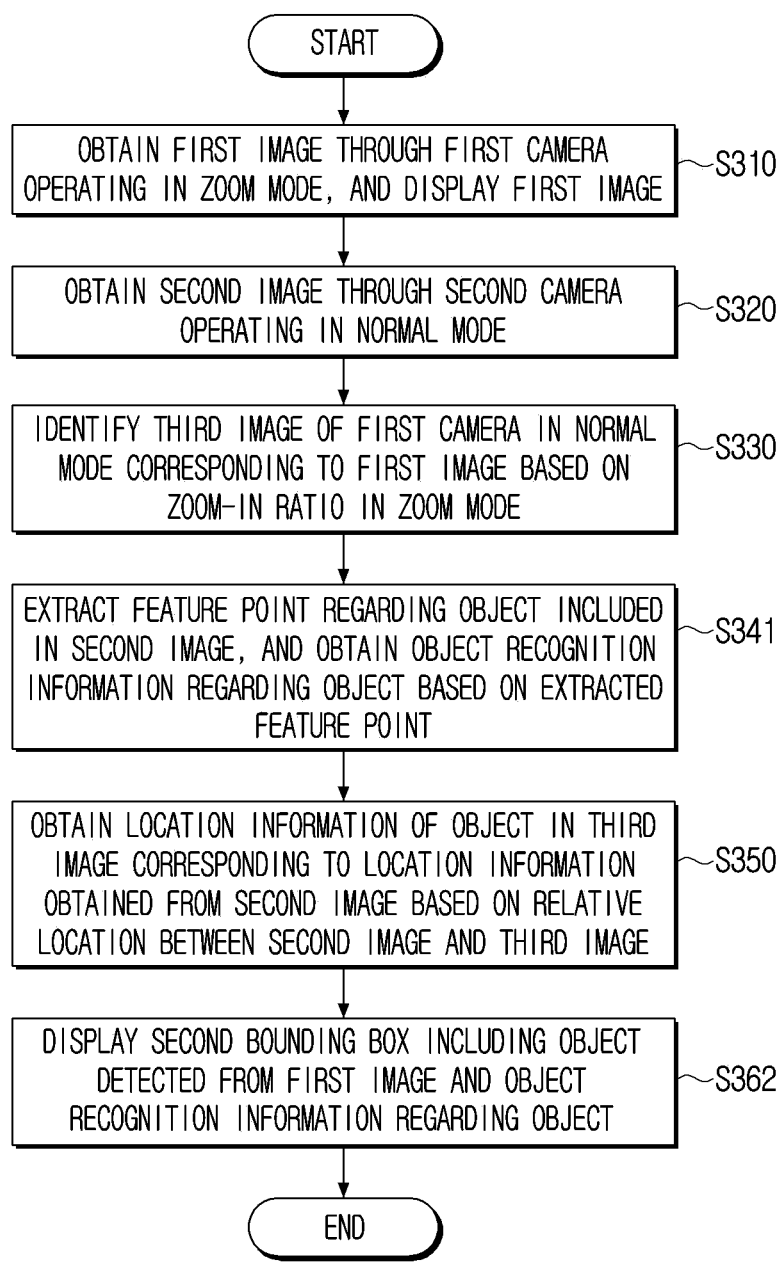
FIG. 16 is a flowchart schematically illustrating displaying object recognition information obtained based on the second image, in the first image according to an embodiment of the disclosure.

FIG. 16 is a flowchart schematically illustrating displaying object recognition information obtained based on the second image, in the first image according to an embodiment of the disclosure.

Figure 17:
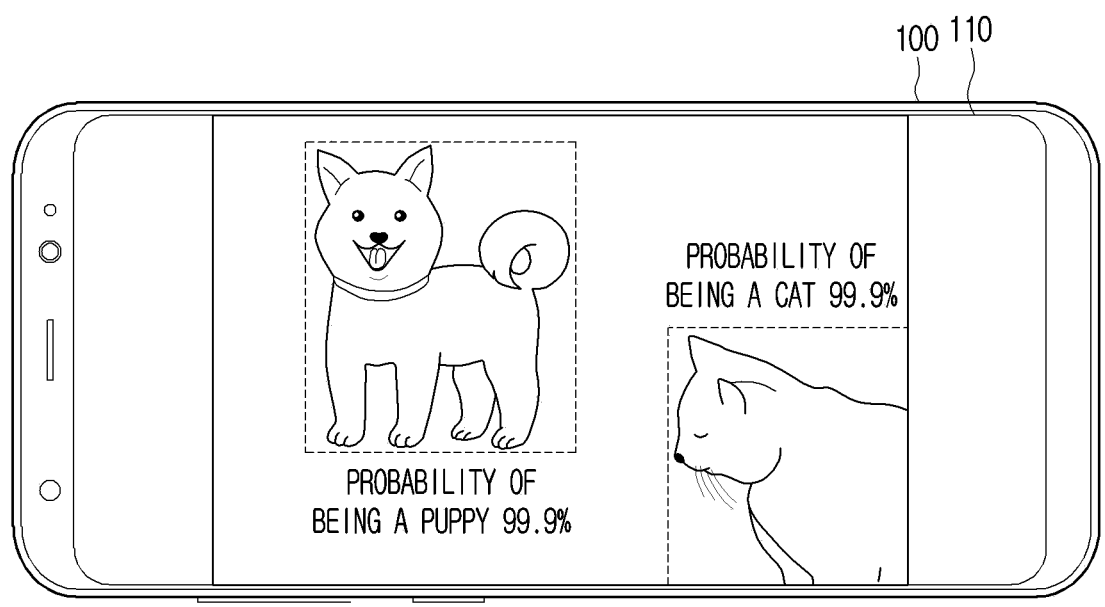
FIG. 17 is a view schematically illustrating displaying object recognition information obtained based on the second image, in the first image, according to an embodiment of the disclosure.

FIG. 17 is a view schematically illustrating displaying object recognition information obtained based on the second image, in the first image, according to an embodiment of the disclosure of the disclosure.

Referring to FIG. 16, according to an embodiment, the processor may extract feature points regarding the object included in the second image, obtain object recognition information regarding the object based on the extracted feature points at operation S341, and display the second bounding box 20 including the object detected in the first image and object recognition information regarding the object at operation S362.

More specifically, based on the second image, the processor 140 performs an object recognition process to identify a type of object detected in the second image. To this end, an artificial intelligence (AI)-based object recognition model may be stored in the memory of the electronic device 100. Here, the object recognition model may be trained based on a dataset, which may include images of a plurality of object types.

According to an embodiment, the AI-based object recognition model may include a convolutional neural network (CNN) model and a recurrent neural network (RNN) model. Hereinafter, a convolutional neural network will be referred to as a "CCN model" and a recurrent neural network will be referred to as an "RNN model".

The CNN model may be formed by alternating between a convolution layer, which applies a plurality of filters to each area of the image to create a feature map, and a pooling layer, which spatially integrates the feature map to extract features that are invariant to changes in location or rotation. In this way, the processor 140 may extract various levels of features within the images obtained from the first camera and the second camera, ranging from low-level features, such as points, lines, sides, or the like, to complex and meaningful high-level features.

The convolutional layer obtains a feature map for each patch of an input image by taking a nonlinear activation function over the inner product of the filter and the local receptive field. Compared to other network structures, the CNN model may be characterized by using a filter having sparse connectivity and shared weights. Such a connectivity structure reduces the number of parameters to be learned and makes learning via backpropagation algorithms more efficient, thereby improving prediction performance.

The integration layer (pooling layer or sub-sampling Layer) may generate a new feature map by utilizing the local information of the feature map obtained from the previous convolutional layer. In general, the feature map newly generated by the integration layer is reduced to a smaller size than the original feature map, and a representative integration method may include max pooling, which selects the maximum value of the corresponding area within the feature map and average pooling, which obtains an average value of the area in the feature map, or the like. The feature map of the integration layer may be generally less affected by the location of arbitrary structures or patterns in the input image than the feature map of the previous layer. In other words, the integration layer may extract features that are more robust to local variations, such as noise or distortion in the input image or previous feature maps, and these features may play an important role in classification performance. Another role of the integration layer is to reflect features of a wider area as moving up to higher learning layers in the deep structure to allow feature extraction layers to be accumulated, thereby reflecting local features in lower layers and reflecting the features of the abstract entire image more as moving up to higher layers.

As such, the features finally extracted through iterations of the convolutional and integration layers may be used to train and predict classification models as classification models, such as multi-layer perceptron (MLP) or support vector machine (SVM) are combined in the form of a fully-connected layer.

The RNN model is a deep learning technique that is effective in learning the order through a structure in which certain parts are repeated, and the state value of the previous state can be input to the next calculation, thereby affecting the result (since it is necessary to recognize the preceding words, letters, and frames when recognizing words, sentences and images).

However, the object recognition model according to the disclosure is not limited to the CNN model and the RNN model, and may be formed with a neural network of various structures.

Referring to FIG. 17, the processor 140 recognized the first object as a dog and the second object as a cat, respectively, based on the second image. The processor 140 then displays information that the first object corresponding to the second-1 bounding box in the third image corresponds to a dog, based on the recognition result information obtained based on the second image. Similarly, the processor 140 displays information that the second object corresponding to the second-2 bounding box in the third image corresponds to a cat, based on the recognition result information obtained based on the second image. More particularly, even though only a portion of the second object is included in the first image, the processor 140 may accurately provide the user with information that the second object corresponding to the second-2 bounding box in the third image corresponds to a cat based on the recognition result information obtained based on the second image.

Meanwhile, according to an embodiment, the electronic device 100 may further include memory storing location information regarding an object obtained based on the second image. At this time, when a new object other than the object in the third image is detected, the processor 140 may obtain location information regarding the new object detected in the third image and, update the location information stored in the memory based on the location information.

Specifically, the processor 140 may detect an object included in the second image, obtain location information regarding the object detected in the second image, and store the location information regarding the object in the memory. This is the location information regarding the object obtained based on the second image obtained in the normal mode, as described above. In the case where the processor 140 obtains the first image using the first camera in the zoom mode, the processor 140 may identify a new object that has not detected or sensed in the normal mode. At this time, the processor 140 identifies the location of the new object in the first image. The processor 140 then identifies the location of the identified new object, such as a seventh coordinate value and an eighth coordinate value for the new object, and converts the seventh coordinate value and the eighth coordinate value into a ninth coordinate value and a tenth coordinate value corresponding to the third image of the first camera, respectively, based on the zoom-in ratio. Subsequently, the processor 140 may update the location information by merging the location information of the object obtained based on the prestored second image with the location information of the new object based on the ninth coordinate value and the tenth coordinate value.

Figure 18:
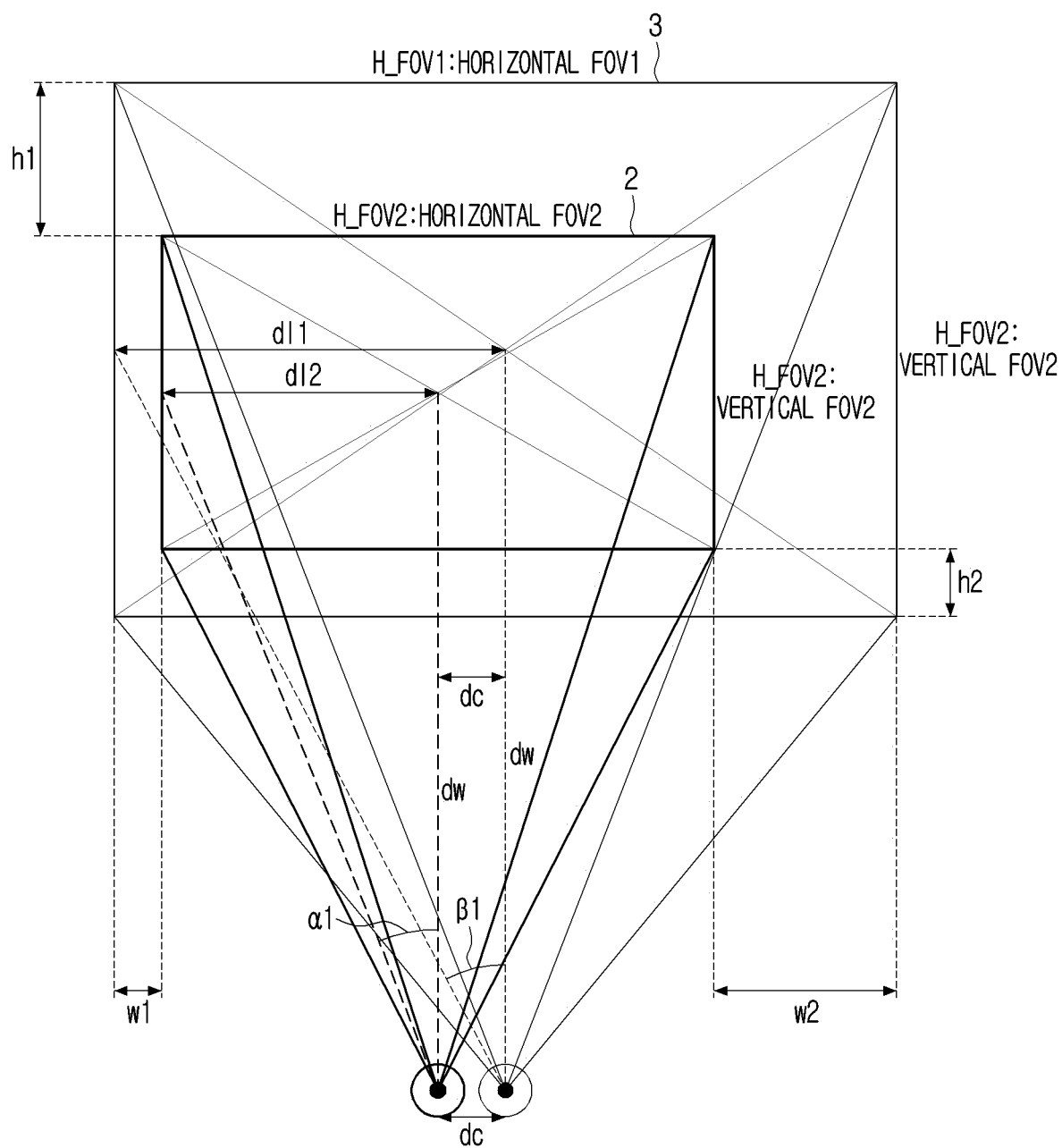
FIG. 18 is a view illustrating identifying a relative location between the second image and the third image based on a separation distance between the first camera and the second camera disposed in an electronic device and a field of view angle of the first camera and a field of view angle of the second camera according to an embodiment of the disclosure.

FIG. 18 is a view illustrating identifying a relative location between the second image and the third image based on a separation distance between the first camera and the second camera disposed in an electronic device and a field of view angle of the first camera and a field of view angle of the second camera according to an embodiment of the disclosure.

Meanwhile, according to an embodiment, the processor 140 may identify a relative location between the second image and the third image based on a separation distance of the first camera 120 and the second camera 130 disposed in the electronic device 100 and a field of view angle of the first camera 120 and a field of view angle of the second camera 130.

Specifically, referring to FIG. 18, the processor 140 identifies a separation distance dC between the first camera 120 and the second camera 130. Meanwhile, information regarding the separation distance dC between the first camera 120 and the second camera 130 may be stored in memory of the electronic device 100.

In addition, the processor 140 identifies the distance of the first camera 120 and the second camera 130 to the object 200. For example, the processor 140 may identify an object & image (O/I) distance of the first camera 120 and an object & image (O/I) distance of the second camera 130, respectively. Meanwhile, according to an embodiment, as the first camera 120 and the second camera 130 are disposed on the rear surface of the electronic device 100, the distance of the first camera 120 to the object and the second camera 130 to the object may be the same. Meanwhile, to this end, the electronic device 100 may further include a sensor (e.g., a time of flight (ToF)) capable of identifying the distance between a camera (e.g., the first camera and the second camera) and the object.

The processor 140 may then identify a relative location between the second image and the third image based on the identified separation distance between the first camera and the second camera, the distance between the first camera and the object, the distance between the second camera and the object, the field of view of the first camera 120, and the field of view of the second camera 130. Referring back to the example described above, the processor 140 may identify a first displacement value and a second displacement value in the x-axis direction of the second image, and a third displacement value and a fourth displacement value in the y-axis direction of the second image with reference to the third image.

Referring to FIG. 18, it is assumed that the first displacement value is w1. At this time, the processor 140 may identify the first displacement value using Equation 1 below.

$$w1=dW*\tan(\beta1)-(dW*\tan(\alpha1)+dC1) \qquad \text{Equation 1}$$

Here, dW is the distance between the first and second cameras and the object, β1 is a ½ value of the horizontal field of view angle of the first camera, α1 is a ½ value of the horizontal field of view angle of the second camera, and dc1 is the horizontal separation distance between the first and second cameras.

Meanwhile, referring to FIG. 18, it is assumed that the second displacement value is w2. In this case, the processor 140 may identify the second displacement value using Equation 2 below.

$$w1=dW*\tan(\beta1)-(dW*\tan(\alpha1)-dC1) \qquad \text{Equation 2}$$

Meanwhile, referring to FIG. 18, it is assumed that the third displacement value is H1. In this case, the processor 140 may identify the third displacement value using Equation 3 below.

$$h1=dW*\tan(\beta2)-(dW*\tan(\alpha2)-dC2) \qquad \text{Equation 3}$$

Here, dW is the distance between the first and second cameras and the object, β2 is a ½ value of the vertical field of view angle of the first camera, α2 is a ½ value of the vertical field of view angle of the second camera, and dC2 is the vertical separation distance between the first and second cameras.

Meanwhile, referring to FIG. 18, it is assumed that the fourth displacement value is H2. In this case, the processor 140 may identify the fourth displacement value using Equation 4 below.

$$h2=dW*\tan(\beta2)-(dW*\tan(\alpha2)-dC2) \qquad \text{Equation 4}$$

Meanwhile, according to another embodiment, the processor 140 may identify respective displacement values based on the field of view angles of the first camera and the second camera. For example, the processor 140 may calculate a horizontal field of view distance of the first camera based on the field of view information of the first camera, and a horizontal field of view distance of the second camera based on the field of view information of the first camera. In addition, the processor 140 may calculate the first displacement value, w1, as a value obtained by subtracting the horizontal viewing angle distance of the second camera and the horizontal separation distance of the first camera and the second camera from the horizontal viewing angle distance of the first camera. However, this will be possible if the line identifying the distance between the first and second cameras and the object passes through the center of each camera's FOV.

Figure 19:
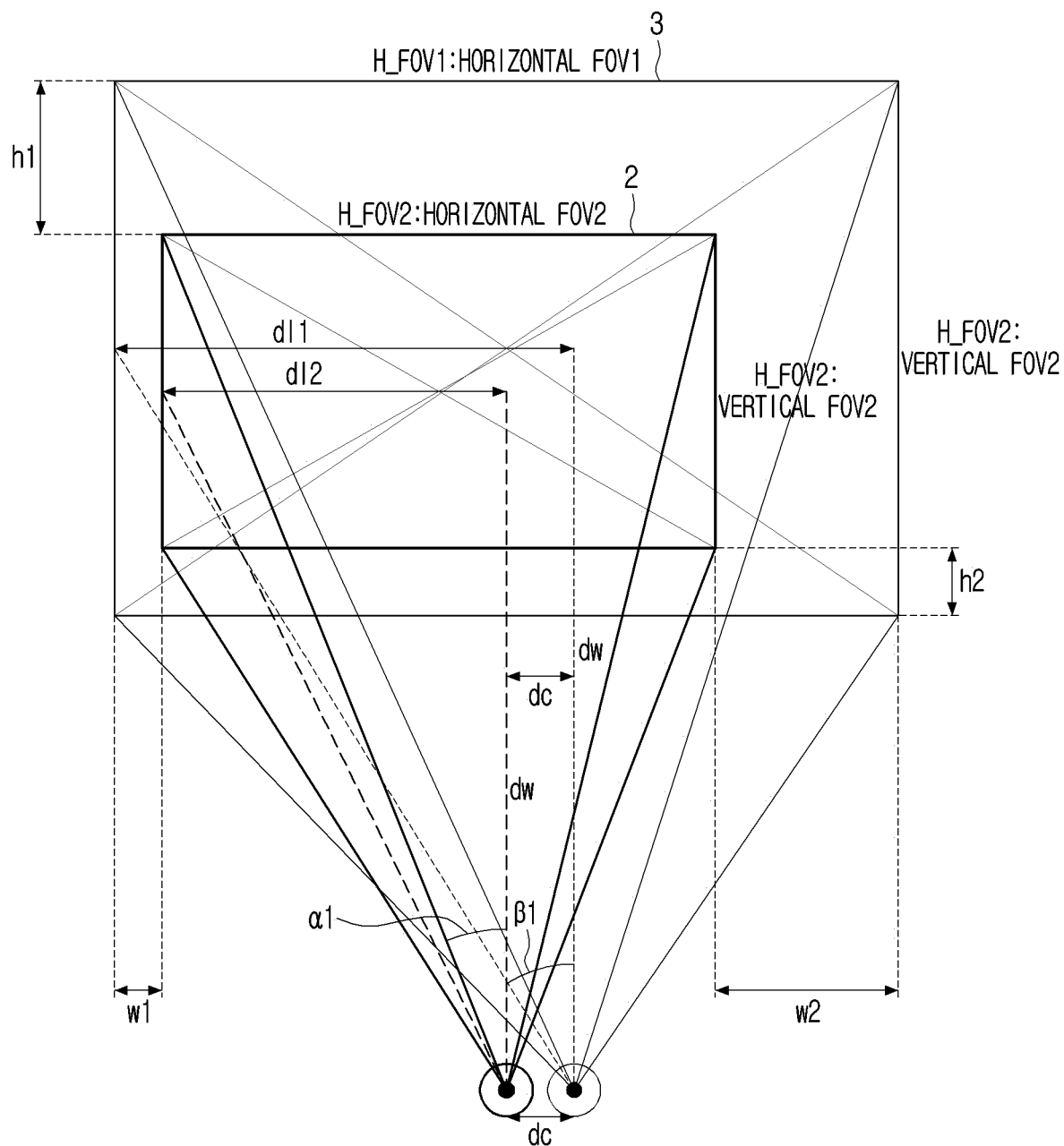
FIG. 19 is a view illustrating identifying a relative location between the second image and the third image based on a separation distance between the first camera and the second camera disposed in an electronic device and a field of view angle of the first camera and a field of view angle of the second camera according to an embodiment of the disclosure.

FIG. 19 is a view illustrating identifying a relative location between the second image and the third image based on a separation distance between the first camera and the second camera disposed in an electronic device and a field of view angle of the first camera and a field of view angle of the second camera according to an embodiment of the disclosure.

Meanwhile, referring to FIG. 19, the lines identifying the distance between the first camera and the second camera and the object may not pass through the center of the FOV of each camera. However, even in this case, the processor may identify respective displacement values (e.g., a first displacement value to a fourth displacement value) based on Equations 1 to 4 described above. More specifically, the processor 140 may identify the first displacement value using Equation 1 below.

$$w1=dW*\tan(\beta1)-(dW*\tan(\alpha1)+dC1) \qquad \text{Equation 1}$$

Here, dW is the distance between the first camera and the second camera and the object, β1 is a ½ value of the horizontal field of view angle of the first camera, α1 is a ½ value of the horizontal field of view angle of the second camera, and dC1 is the horizontal separation distance of the first camera and the second camera. Hereinafter, the method of identifying the second to fourth displacement values is omitted because it is consistent with the method described above with reference to FIG. 18. However, if the line identifying the distance between the first and second cameras and the object does not pass through the center of the FOV of each camera, the method of calculating the displacement value using the field of view angle of each camera described above does not apply.

Meanwhile, although not clearly shown in the figures, the distance of the first camera 120 and the second camera 130 to the object may be different according to embodiments of the disclosure. In other words, the distance between the first camera and the object and the distance between the second camera and the object may be different. In such cases, the processor 140 may identify the first to fourth displacement values based on the methods described above after placing the third image that can be obtained from the first camera and the second image obtained from the second camera on the same plane, based on the distance of each camera to the object.

Figure 20:
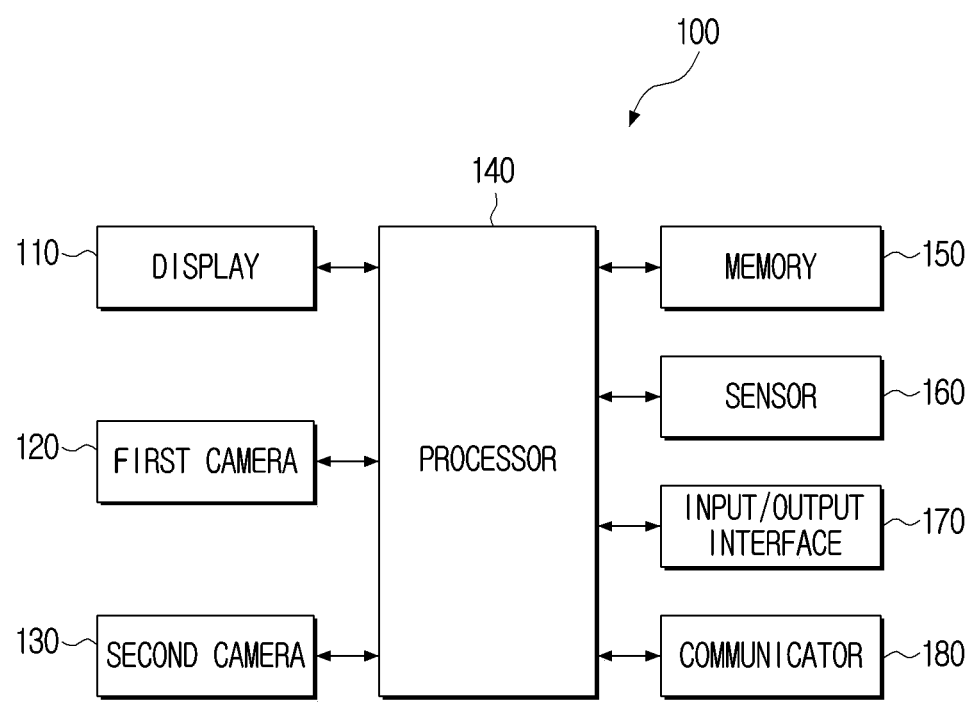
FIG. 20 is a detailed configuration view of an electronic device according to an embodiment of the disclosure.

FIG. 20 is a detailed configuration view of an electronic device according to an embodiment of the disclosure.

Referring to FIG. 20, the electronic device 100 according to an embodiment includes the display 110, the first camera 120, the second camera 130, the processor 140, memory 150, a sensor 160, an input/output interface 170, and a communicator 180.

The display 110, first camera 120, second camera 130, and processor 140 of the electronic device 100 are described above and thus, the description thereof will be omitted.

The memory 150 may store software programs and applications for operating the electronic device 100, and may store various information, such as various data that is entered, set, or generated during execution of the programs or applications. For example, the memory 150 may be implemented in the form of a field programmable gate array (FPGA), according to an embodiment. Further, the memory 150 may store location information of an object obtained based on the second image. The memory 150 may also store separation distance information of the first camera and the second camera, field of view angle information of the first camera, and field of view angle information of the second camera.

Meanwhile, the electronic device 100 obtains various information regarding the electronic device 100 using the sensor 160. For example, the electronic device 100 may use the sensor 160 to identify a distance between the first camera and the object 200 and a distance value between the second camera and the object 200. To this end, the sensor 160 may be implemented as a ToF sensor included in each of the cameras (e.g., the first camera and the second camera).

In addition, the electronic device 100 may receive various information regarding control of the electronic device 100 from the user. For example, the electronic device 100 may receive commands via the input/output interface 170 to adjust the field of view angle or focal length of the first camera or the second camera. More specifically, the electronic device 100 may receive a user input to change the first camera in the normal mode to the zoom mode via the input/output interface 170. To this end, the input/output interface 170 may be implemented as a device, such as a button, touch pad, mouse, and keyboard, or may be implemented as a touch screen, remote control transmitter/receiver, or the like that can perform the above-described display function as well as the operation input function.

Further, the electronic device 100, via the communicator 180, may communicate with various external devices using wireless communication technology or mobile communication technology to transmit and receive various information related to the object and the electronic device. Wireless communication technologies include, for example, Bluetooth, Bluetooth low energy, CAN communication, Wi-Fi, Wi-Fi direct, ultrawide band (UWB), Zigbee, infrared data association (IrDA), or near field communication (NFC), or the like, and mobile communication technologies may include 3GPP, Wi-Max, long term evolution (LTE), 5G, or the like.

Meanwhile, the various embodiments described above may be implemented in a computer or a recording medium readable by a computer or a similar device using software, hardware, or a combination of software and hardware. In some cases, the embodiments described in the specification may be implemented by a processor itself. According to software implementation, the embodiments, such as the procedures and functions described in the specification may be implemented by separate software modules. Each of the software modules may perform one or more functions and operations described in the specification.

Meanwhile, computer instructions for performing processing operations of a robot device according to the various embodiment of the disclosure described above may be stored in a non-transitory computer-readable medium. The computer instructions stored in the non-transitory computer-readable medium may allow a specific device to perform the processing operations of the electronic device according to the various embodiments described above in case that the computer instructions are executed by a processor of the specific device.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method of any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure of defined by the appended claims and their equivalents.

What is claimed is:

1. An electronic device comprising:
   a display;
   a first camera;
   a second camera;
   memory storing one or more computer programs; and
   one or more processors communicatively coupled to the display, the first camera, the second camera, and the memory,
   wherein the one or more computer programs include computer-executable instructions that, when executed by the one or more processors, cause the electronic device to:
   obtain a first image through the first camera operating in a zoom mode, control the display to display the first image,
   obtain a second image through the second camera operating in a normal mode,
   identify a third image of the first camera in the normal mode corresponding to the first image based on a zoom-in ratio in the zoom mode, by detecting an object included in the second image,
   obtain location information regarding the detected object in the second image,
   based on a relative location between the second image and the third image, obtain location information of the object in the third image corresponding to the location information obtained from the second image, and
   based on the location information of the object in the third image, detect the object in the first image.

2. The electronic device of claim 1,
   wherein the location information includes a first coordinate value and a second coordinate value of a first bounding box including the object detected from the second image, and
   wherein the first coordinate value is a coordinate value of an upper left corner of the first bounding box, and the second coordinate value is a coordinate value of a lower right corner of the first bounding box.

3. The electronic device of claim 2, wherein the one or more computer programs further include computer-executable instructions that, when executed by the one or more processors, cause the electronic device to:

based on a relative location between the second image and the third image, identify each of a third coordinate value and a fourth coordinate value regarding the object in the third image, based on a zoom-in ratio in the zoom mode, identify a size and location of a frame corresponding to the first image in the third image, and based on the frame including at least one of the third coordinate value or the fourth coordinate value, based on the third coordinate value and the fourth coordinate value, detect the object in the first image obtained through the first camera operating in the zoom mode.

4. The electronic device of claim 3, wherein the one or more computer programs further include computer-executable instructions that, when executed by the one or more processors, cause the electronic device to:

based on the zoom-in ratio and a size and location of a frame, identify each of a fifth coordinate value and a sixth coordinate value in the first image, which correspond to the third coordinate value and the fourth coordinate value, and based on the fifth coordinate value and the sixth coordinate value, generate and display a second bounding box including the object detected from the first image, wherein the fifth coordinate value is a coordinate value of an upper left corner of the second bounding box, and wherein the sixth coordinate value is a coordinate value of a lower right corner of the second bounding box.

5. The electronic device of claim 4, wherein the one or more computer programs further include computer-executable instructions that, when executed by the one or more processors, cause the electronic device to:

based on the fifth coordinate value and the sixth coordinate value, identify a width of the second bounding box including the object detected from the first image, and based on the identified width of the second bounding box being equal to or greater than a predetermined value, display the second bounding box.

6. The electronic device of claim 4, wherein the one or more computer programs further include computer-executable instructions that, when executed by the one or more processors, cause the electronic device to:

based on the fifth coordinate value and the sixth coordinate value, identify a width of the second bounding box including the object detected from the first image, and based on the width of the second bounding box being less than a predetermined value, identify an object image in the second image based on the first bounding box, and detect the object in the first image by matching the identified object image to the first image.

7. The electronic device of claim 4, wherein the one or more computer programs further include computer-executable instructions that, when executed by the one or more processors, cause the electronic device to:

extract a feature point regarding the object included in the second image, obtain object recognition information regarding the object based on the extracted feature point, and display the second bounding box including the object detected from the first image and object recognition information regarding the object.

8. The electronic device of claim 1, wherein the one or more computer programs further include computer-executable instructions that, when executed by the one or more processors, cause the electronic device to:

based on a new object other than the object being detected from the third image, obtain location information regarding the new object detected from the third image and update location information stored in the memory based on the location information.

9. The electronic device of claim 1, wherein the one or more computer programs further include computer-executable instructions that, when executed by the one or more processors, cause the electronic device to:

identify a relative location between the second image and the third image based on a separation distance of the first camera and the second camera disposed in the electronic device and a field of view angle of the first camera and a field of view angle of the second camera, and based on the identified relative location, obtain location information of the object in the third image corresponding to the location information obtained from the second image.

10. A method performed by an electronic device including a first camera and a second camera, the method comprising:

obtaining a first image through the first camera operating in a zoom mode, and displaying the first image;

obtaining a second image through the second camera operating in a normal mode;

identifying a third image of the first camera in the normal mode corresponding to the first image based on a zoom-in ratio in the zoom mode;

by detecting an object included in the second image, obtaining location information regarding the detected object in the second image;

based on a relative location between the second image and the third image, obtaining location information of the object in the third image corresponding to the location information obtained from the second image; and based on the location information of the object in the third image, detecting the object in the first image.

11. The method of claim 10, wherein the location information includes a first coordinate value and a second coordinate value of a first bounding box including the object detected from the second image, and wherein the first coordinate value is a coordinate value of an upper left corner of the first bounding box, and the second coordinate value is a coordinate value of a lower right corner of the first bounding box.

12. The method of claim 11, wherein the obtaining of the location information of the object in the third image comprises:

based on a relative location between the second image and the third image, identifying each of a third coordinate value and a fourth coordinate value regarding the object in the third image, which correspond to the first coordinate value and the second coordinate value, and based on a zoom-in ratio in the zoom mode, identifying a size and location of a frame corresponding to the first image in the third image, and wherein the detecting of the object in the first image comprises:

based on the frame including at least one of the third coordinate value or the fourth coordinate value, based on the third coordinate value and the fourth coordinate value, detecting the object in the first image obtained through the first camera operating in the zoom mode.

13. The method of claim 12, further comprising:

based on a size and location of the frame, identifying each of a fifth coordinate value and a sixth coordinate value in the first image, which correspond to the third coordinate value and the fourth coordinate value; and based on the fifth coordinate value and the sixth coordinate value, generating and displaying a second bounding box including the object detected from the first image, wherein the fifth coordinate value is a coordinate value of an upper left corner of the second bounding box, and wherein the sixth coordinate value is a coordinate value of a lower right corner of the second bounding box.

14. The method of claim 13, wherein the generating and displaying of the second bounding box comprises:

based on the fifth coordinate value and the sixth coordinate value, identifying a width of the second bounding box including the object detected from the first image; and based on the identified width of the second bounding box being equal to or greater than a predetermined value, displaying the second bounding box.

15. The method of claim 13, wherein the generating and displaying of the second bounding box comprises:

based on the fifth coordinate value and the sixth coordinate value, identifying a width of the second bounding box including the object detected from the first image;

based on the width of the second bounding box being less than a predetermined value, identifying an object image in the second image based on the first bounding box; and detecting the object in the first image by matching the identified object image to the first image.

16. The method of claim 13, further comprising:

extracting a feature point regarding the object included in the second image;

obtaining object recognition information regarding the object based on the extracted feature point; and displaying the second bounding box including the object detected from the first image and object recognition information regarding the object.

17. The method of claim 10, further comprising:

based on a new object other than the object being detected from the third image, obtaining location information regarding the new object detected from the third image and update location information stored in memory based on the location information.

18. The method of claim 10, further comprising:

identifying a relative location between the second image and the third image based on a separation distance of the first camera and the second camera disposed in the electronic device and a field of view angle of the first camera and a field of view angle of the second camera, and based on the identified relative location, obtaining location information of the object in the third image corresponding to the location information obtained from the second image.

19. One or more non-transitory computer-readable storage media storing computer-executable instructions that, when executed by one or more processors of an electronic device, cause the electronic device to perform operations, the operations comprising:

obtaining a first image through a first camera operating in a zoom mode, and displaying the first image;

obtaining a second image through a second camera operating in a normal mode;

identifying a third image of the first camera in the normal mode corresponding to the first image based on a zoom-in ratio in the zoom mode;

by detecting an object included in the second image, obtaining location information regarding the detected object in the second image;

based on a relative location between the second image and the third image, obtaining location information of the object in the third image corresponding to the location information obtained from the second image; and based on the location information of the object in the third image, detecting the object in the first image.

20. The one or more non-transitory computer-readable storage media of claim 19, wherein the location information includes a first coordinate value and a second coordinate value of a first bounding box including the object detected from the second image, and wherein the first coordinate value is a coordinate value of an upper left corner of the first bounding box, and the second coordinate value is a coordinate value of a lower right corner of the first bounding box.

* * * * *